United States Patent
Sun et al.

(10) Patent No.: US 10,880,139 B2
(45) Date of Patent: *Dec. 29, 2020

(54) ENERGY DETERMINATIONS FOR MULTI-USER SUPERPOSITION TRANSMISSIONS

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,116

(22) Filed: Aug. 14, 2019

(65) Prior Publication Data

US 2019/0372810 A1    Dec. 5, 2019

Related U.S. Application Data

(63) Continuation of application No. 15/442,510, filed on Feb. 24, 2017, now Pat. No. 10,397,032.

(60) Provisional application No. 62/378,165, filed on Aug. 22, 2016.

(51) Int. Cl.
*H04L 27/20* (2006.01)
*H04L 5/00* (2006.01)
(Continued)

(52) U.S. Cl.
CPC .............. *H04L 27/20* (2013.01); *H04L 5/005* (2013.01); *H04L 27/0008* (2013.01);
(Continued)

(58) Field of Classification Search
CPC ................................ H04L 27/20; H04L 27/22
(Continued)

(56) References Cited

U.S. PATENT DOCUMENTS 9,825,798 B1 * 11/2017 Sun ........................ H04L 27/362
10,397,032 B2 * 8/2019 Sun ...................... H04L 27/2649
(Continued)

FOREIGN PATENT DOCUMENTS

WO    WO2015151635 A1    10/2015

OTHER PUBLICATIONS

International Search Report and Written Opinion—PCT/US2017/047406—ISA/EPO—dated Oct. 16, 2017.
(Continued)

*Primary Examiner* — Kevin M Burd
(74) *Attorney, Agent, or Firm* — QUALCOMM Incorporated

(57) ABSTRACT

Methods, systems, and devices for wireless communication using multi-user superposition (MUST) techniques in conjunction with multiple-input multiple-output (MIMO) techniques are described. A base station may configure an enhancement layer user equipment (UE) and a base layer UE with a transmit power ratio associated with enhancement layer transmissions and base layer transmissions. The base station may then transmit on the base layer and enhancement layer on multiple spatial layers using MIMO techniques. A UE may receive the transmission, determine the total power of the transmission on all spatial layers, and apply a power splitting constraint to determine the distribution of power for the transmission on the different spatial layers. The UE may then determine the transmit power of a transmission on a specific layer based on the power ratio configuration and use this information to demodulate and decode the transmission.

46 Claims, 18 Drawing Sheets

(51) Int. Cl.
*H04L 27/00* (2006.01)
*H04W 52/34* (2009.01)
*H04W 52/42* (2009.01)
*H04L 27/22* (2006.01)
*H04L 27/26* (2006.01)
*H04L 27/38* (2006.01)
H04B 7/0452 (2017.01)
H04L 27/34 (2006.01)
H04W 88/02 (2009.01)

(52) U.S. Cl.
CPC .......... *H04L 27/22* (2013.01); *H04L 27/2649* (2013.01); *H04L 27/38* (2013.01); *H04W 52/346* (2013.01); *H04W 52/42* (2013.01); H04B 7/0452 (2013.01); H04L 27/3488 (2013.01); H04W 88/02 (2013.01)

(58) Field of Classification Search
USPC ................................ 375/324, 322, 316, 295
See application file for complete search history.

(56) References Cited

U.S. PATENT DOCUMENTS

| | | |
|---|---|---|
| 2014/0010154 A1 | 1/2014 | Hong et al. |
| 2015/0312074 A1 | 10/2015 | Zhu et al. |
| 2016/0119096 A1 | 4/2016 | Sun et al. |
| 2016/0119807 A1 | 4/2016 | Sun et al. |
| 2017/0078973 A1 | 3/2017 | Ohwatari et al. |
| 2018/0054339 A1 | 2/2018 | Sun et al. |

OTHER PUBLICATIONS

Qualcomm Incorporated: "Multiuser Superposition Schemes", 3GPP Draft; R1-157075, 3rd Generation Partnership Project (3GPP), Mobile Competence Centre; 650, Route Des Lucioles; F-06921 Sophia-Anti Polls Cedex; France, vol. RAN WG1, No. Anaheim CA, USA; Nov. 15, 2015, Retrieved from the Internet: URL:http://www.3gpp.org/ftp/Meetings_3GPP_SYNC/RAN1/Docs/ [retrieved on Nov. 15, 2015]. 7 pages.

* cited by examiner

ENERGY DETERMINATIONS FOR MULTI-USER SUPERPOSITION TRANSMISSIONS

CROSS REFERENCES

The present Application for patent is a Continuation of U.S. patent application Ser. No. 15/442,510 by Sun et al., entitled, "Energy Determinations For Multi-User Superposition Transmissions" filed Feb. 24, 2017, which claims priority to U.S. Provisional Patent Application No. 62/378, 165 by Sun et al., entitled "Energy Per Resource Element Determination For Multi-User Superposition Transmission," filed Aug. 22, 2016, assigned to the assignee hereof, and expressly incorporated by reference herein.

BACKGROUND

The following relates generally to wireless communication and more specifically to energy determinations for multi-user superposition transmissions (MUSTs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system). A wireless multiple-access communications system may include a number of base stations, each simultaneously supporting communication for multiple communication devices, which may be otherwise known as user equipment (UE).

CDMA, TDMA, FDMA, and OFDMA systems may communicate with multiple UEs through the use of resource sharing and/or orthogonal transmissions. In some cases, separate communications to multiple UEs may be accomplished by strategically sharing resources or by orthogonally transmitting to the UEs over simultaneously-shared ("common") resources. For instance, a TDMA system may designate time intervals for transmissions during which a UE is scheduled to receive a transmission over a common frequency channel—e.g., the base station may transmit to a first UE in a first time interval, a second UE in a second time interval, etc. An FDMA system may simultaneously communicate with multiple UEs by sending UE-specific transmissions over separate frequency resources allocated to each of the UEs.

CDMA systems may simultaneously transmit to each of the UEs using the same time and frequency resources, but may uniquely modulate transmissions to different UEs with an orthogonal code. The UEs may be assigned unique orthogonal codes, and may apply the orthogonal codes to received signals to identify the transmission intended for that UE. OFDMA utilizes a combination of TDMA and FDMA techniques applied over orthogonal subcarriers. In some cases, multiple-input multiple-output (MIMO) techniques may be employed, which take advantage of spatial properties of channels to the UEs to separate data streams sent over different spatial resources. For example, MIMO techniques include modulating transmission streams with space-time orthogonal codes, such as spatial frequency block codes (SFBC). These spatial resources may be called spatial layers, and the same or different streams of data may be transmitted over different spatial layers. For single-user MIMO (SU-MIMO), multiple spatial layers are transmitted to the same UE, while in multiple user MIMO (MU-MIMO), multiple spatial layers are transmitted to different UEs.

In some cases, a wireless communications system may utilize multi-user superposition transmission (MUST) techniques that share time and frequency resources to support communications with multiple UEs without using orthogonal transmissions. For example, a MUST transmission may include multiple streams of data intended for multiple UEs using common resources—e.g., at least partially overlapping time, frequency, and/or spatial resources—but may transmit the streams of data without uniquely orthogonalizing the transmissions to the different UEs. MUST transmissions may take advantage of the physical locations of the UEs in the wireless communication system to transmit multiple streams of data intended for multiple UEs. The different streams of data may be transmitted over different non-orthogonal transmission layers. In some cases, the base station may transmit an enhancement layer to a first UE that has relatively higher geometry (e.g., higher signal-to-noise ratio (SNR), closer to the base station) using overlapping resources and a base layer to a second UE that has a relatively weaker geometry (e.g., lower signal-to-noise ratio (SNR), farther from the base station). MUST may also be referred to as non-orthogonal multiple access (NOMA).

In some cases, MUST techniques may be combined with MIMO techniques. For example, MUST transmission layers may be multiplexed on one or more spatial layers in various ways including by using different transmit power levels. This may result in a power split between the base layer and the enhancement layer, which may be used to support separate transmissions to UEs with different geometries. In some cases, the use of multiple spatial layers may result in an additional power split between spatial layers. These techniques may result in a large number of different power split combinations between the enhancement layer and base layer, which may provide challenges in demodulation at the UEs.

SUMMARY

The described techniques relate to methods, systems, and devices for determining power splits of a multi-user superposition transmissions (MUST) across non-orthogonal and spatial layers. A base station may configure an enhancement layer user equipment (UE) and a base layer UE with a transmit power ratio associated with enhancement layer transmissions and base layer transmissions. The base station may then transmit on the base layer and enhancement layer on multiple spatial layers using multiple-input multiple output (MIMO) techniques. A UE may receive the transmission and determine the total power of the transmission on all spatial layers based on measuring reference signal power. The UE may apply a power splitting constraint to determine the distribution of power for the transmission on the different non-orthogonal and spatial layers based on the power ratio configuration. The UE may then use this information to demodulate and decode the transmission.

A method of wireless communication is described. The method may include receiving a transmission including a base layer and an enhancement layer, where the enhancement layer includes a first data stream modulated according to a first modulation order and the base layer includes a second data stream modulated according to a second modulation order, determining power levels of the enhancement layer and the base layer for each of one or more spatial layers of the transmission based at least in part on a power ratio between the base layer and the enhancement layer and a measured power level for a reference signal of the transmission, and de-mapping symbols of the received transmission based at least in part on the determined power levels to obtain the first data stream.

An apparatus for wireless communication is described. The apparatus may include means for receiving a transmission including a base layer and an enhancement layer, where the enhancement layer includes a first data stream modulated according to a first modulation order and the base layer includes a second data stream modulated according to a second modulation order, means for determining power levels of the enhancement layer and the base layer for each of one or more spatial layers of the transmission based at least in part on a power ratio between the base layer and the enhancement layer and a measured power level for a reference signal of the transmission, and means for de-mapping symbols of the received transmission based at least in part on the determined power levels to obtain the first data stream.

Another apparatus for wireless communication is described. The apparatus may include a processor, memory in electronic communication with the processor, and instructions stored in the memory. The instructions may be operable to cause the processor to receive a transmission including a base layer and an enhancement layer, where the enhancement layer includes a first data stream modulated according to a first modulation order and the base layer includes a second data stream modulated according to a second modulation order, determine power levels of the enhancement layer and the base layer for each of one or more spatial layers of the transmission based at least in part on a power ratio between the base layer and the enhancement layer and a measured power level for a reference signal of the transmission, and de-map symbols of the received transmission based at least in part on the determined power levels to obtain the first data stream.

A non-transitory computer readable medium for wireless communication is described. The non-transitory computer-readable medium may include instructions operable to cause a processor to receive a transmission including a base layer and an enhancement layer, where the enhancement layer includes a first data stream modulated according to a first modulation order and the base layer includes a second data stream modulated according to a second modulation order, determine power levels of the enhancement layer and the base layer for each of one or more spatial layers of the transmission based at least in part on a power ratio between the base layer and the enhancement layer and a measured power level for a reference signal of the transmission, and de-map symbols of the received transmission based at least in part on the determined power levels to obtain the first data stream.

In some examples of the method, apparatus, and non-transitory computer-readable medium described above, the reference signal includes a cell-specific reference signal (CRS), and where the determining includes determining a total power level of the enhancement layer and the base layer for each of the one or more spatial layers by applying a first UE-specific power ratio configured for the UE to the measured power level of the CRS. Some examples of the method, apparatus, and non-transitory computer-readable medium described above may further include processes, features, means, or instructions for receiving a transmission including a single layer on a single spatial layer, and determining a total power level of the single layer transmission by applying the first UE-specific power ratio configured for the UE to a measured power level for a CRS of the transmission.

In some examples of the method, apparatus, and non-transitory computer-readable medium described above, the determining the power levels may be performed independently of a second UE-specific power ratio configured for a second UE associated with the base layer. In some examples of the method, apparatus, and non-transitory computer-readable medium described above, the determining the power levels of the enhancement layer and the base layer for each of the one or more spatial layers may be based at least in part on a base layer modulation order and an enhancement layer modulation order dependent power ratio.

In some examples of the method, apparatus, and non-transitory computer-readable medium described above, the one or more spatial layers includes a plurality of spatial layers, and where the determining includes determining the power levels of the enhancement layer and the base layer for each of the plurality of spatial layers of the transmission based at least in part on a predetermined power split between the plurality of spatial layers. In some examples of the method, apparatus, and non-transitory computer-readable medium described above, the predetermined power split includes an equal power split among all of the plurality of spatial layers.

In some examples of the method, apparatus, and non-transitory computer-readable medium described above, the one or more spatial layers includes a plurality of spatial layers, and where the determining includes determining the power levels of the enhancement layer and the base layer for each of the plurality of spatial layers of the transmission based at least in part on a condition of equal power levels for each of a plurality of base layers mapped to respective ones of the plurality of spatial layers. In some examples of the method, apparatus, and non-transitory computer-readable medium described above, the one or more spatial layers includes a plurality of spatial layers, and where the determining includes determining the power levels of the enhancement layer and the base layer for each of the plurality of spatial layers of the transmission based at least in part on a condition of equal power levels for each of a plurality of enhancement layers mapped to respective ones of the plurality of spatial layers.

In some examples of the method, apparatus, and non-transitory computer-readable medium described above, the reference signal includes a demodulation reference signal (DMRS), and where the determining includes determining that a total power level of the enhancement layer and the base layer on a respective spatial layer of the transmission corresponds to the measured power level of the DMRS for the respective spatial layer. In some examples of the method, apparatus, and non-transitory computer-readable medium described above, the reference signal includes a CRS, and where the determining includes determining the power level of the enhancement layer on a respective spatial layer of the transmission by applying a UE-specific power ratio configured for the UE to the measured power level of the CRS for the respective spatial layer.

In some examples of the method, apparatus, and non-transitory computer-readable medium described above, the second modulation order may be a predetermined modulation order. In some examples of the method, apparatus, and non-transitory computer-readable medium described above, the predetermined modulation order corresponds to quadrature phase shift keying (QPSK). In some examples of the method, apparatus, and non-transitory computer-readable medium described above, the first modulation order corresponds to any of QPSK, 16-quadrature amplitude modulation (QAM), or 64-QAM.

A method of wireless communication is described. The method may include configuring a first UE-specific power ratio for a first UE and a second UE-specific power ratio for a second UE, scheduling a transmission including a base layer and an enhancement layer, where the enhancement layer includes a first data stream for the first UE modulated according to a first modulation order and the base layer includes a second data stream for the second UE modulated according to a second modulation order, determining transmit power levels of the enhancement layer and the base layer for each of one or more spatial layers of the transmission based on the first UE-specific power ratio, conveying a power ratio between the base layer and the enhancement layer for the transmission to the first UE, and transmitting the transmission to the first UE and the second UE.

An apparatus for wireless communication is described. The apparatus may include means for configuring a first UE-specific power ratio for a first UE and a second UE-specific power ratio for a second UE, means for scheduling a transmission including a base layer and an enhancement layer, where the enhancement layer includes a first data stream for the first UE modulated according to a first modulation order and the base layer includes a second data stream for the second UE modulated according to a second modulation order, means for determining transmit power levels of the enhancement layer and the base layer for each of one or more spatial layers of the transmission based on the first UE-specific power ratio, means for conveying a power ratio between the base layer and the enhancement layer for the transmission to the first UE, and means for transmitting the transmission to the first UE and the second UE.

Another apparatus for wireless communication is described. The apparatus may include a processor, memory in electronic communication with the processor, and instructions stored in the memory. The instructions may be operable to cause the processor to configure a first UE-specific power ratio for a first UE and a second UE-specific power ratio for a second UE, schedule a transmission including a base layer and an enhancement layer, where the enhancement layer includes a first data stream for the first UE modulated according to a first modulation order and the base layer includes a second data stream for the second UE modulated according to a second modulation order, determine transmit power levels of the enhancement layer and the base layer for each of one or more spatial layers of the transmission based on the first UE-specific power ratio, convey a power ratio between the base layer and the enhancement layer for the transmission to the first UE, and transmit the transmission to the first UE and the second UE.

A non-transitory computer readable medium for wireless communication is described. The non-transitory computer-readable medium may include instructions operable to cause a processor to configure a first UE-specific power ratio for a first UE and a second UE-specific power ratio for a second UE, schedule a transmission including a base layer and an enhancement layer, where the enhancement layer includes a first data stream for the first UE modulated according to a first modulation order and the base layer includes a second data stream for the second UE modulated according to a second modulation order, determine transmit power levels of the enhancement layer and the base layer for each of one or more spatial layers of the transmission based on the first UE-specific power ratio, convey a power ratio between the base layer and the enhancement layer for the transmission to the first UE, and transmit the transmission to the first UE and the second UE.

In some examples of the method, apparatus, and non-transitory computer-readable medium described above, the transmission includes a CRS, and the determining includes determining a total transmit power level of the enhancement layer and the base layer for each of the one or more spatial layers of the transmission based on the first UE-specific power ratio by applying the first UE-specific power ratio to a transmit power level of the CRS for each of the one or more spatial layers. In some examples of the method, apparatus, and non-transitory computer-readable medium described above, the determining the transmit power levels of the enhancement layer and the base layer for the transmission may be performed independently of the second UE-specific power ratio.

Some examples of the method, apparatus, and non-transitory computer-readable medium described above may further include processes, features, means, or instructions for selecting the power ratio based on a set of enhancement layer modulation order dependent power ratios. In some examples of the method, apparatus, and non-transitory computer-readable medium described above, the one or more spatial layers includes a plurality of spatial layers, and where the determining includes determining the transmit power levels of the enhancement layer and the base layer for each of the plurality of spatial layers of the transmission based at least in part on a predetermined power split between the plurality of spatial layers.

In some examples of the method, apparatus, and non-transitory computer-readable medium described above, the predetermined power split includes an equal power split among all of the plurality of spatial layers. In some examples of the method, apparatus, and non-transitory computer-readable medium described above, the one or more spatial layers includes a plurality of spatial layers, and where the determining includes determining the transmit power levels of the enhancement layer and the base layer for each of the plurality of spatial layers of the transmission based at least in part on a condition of equal power levels for each of a plurality of base layers mapped to respective ones of the plurality of spatial layers.

In some examples of the method, apparatus, and non-transitory computer-readable medium described above, the one or more spatial layers includes a plurality of spatial layers, and where the determining includes determining the transmit power levels of the enhancement layer and the base layer for each of the plurality of spatial layers of the transmission based at least in part on a condition of equal power levels for each of a plurality of enhancement layers mapped to respective ones of the plurality of spatial layers.

In some examples of the method, apparatus, and non-transitory computer-readable medium described above, the transmission includes a DMRS, and where the determining includes determining that a total transmit power level of the enhancement layer and the base layer on a respective spatial layer of the transmission corresponds to the transmit power level of the respective DMRS for the respective spatial layer. In some examples of the method, apparatus, and non-transitory computer-readable medium described above, the transmission includes a CRS, and where the determining includes determining the transmit power level of the enhancement layer on a respective spatial layer of the transmission by applying the second UE-specific power ratio configured for the second UE to the transmit power level of the respective CRS for the respective spatial layer.

In some examples of the method, apparatus, and non-transitory computer-readable medium described above, the second modulation order may be a predetermined modulation order. In some examples of the method, apparatus, and non-transitory computer-readable medium described above, the predetermined modulation order for the base layer corresponds to QPSK. In some examples of the method, apparatus, and non-transitory computer-readable medium described above, the first modulation order corresponds to any of QPSK, 16-QAM, or 64-QAM.

In some examples of the method, apparatus, and non-transitory computer-readable medium described above, the power ratio may be conveyed to the second UE in an enhancement layer modulation order dependent power ratio parameter of a downlink control information message associated with the transmission.

DETAILED DESCRIPTION

Techniques for determining the distribution of power across non-orthogonal and spatial layers of a transmission are described. A UE may receive a transmission and determine the power allocated to various non-orthogonal and spatial layers of the transmission for demodulation and decoding (e.g., de-mapping, etc.). The UE may determine the energy per resource element (EPRE) for a transmission including transmission layers for multiple UEs based on a unicast (e.g., UE-specific) traffic-to-pilot power ratio (TPR). The UE 115 may receive an indication of a power ratio between transmissions on different non-orthogonal transmission layers, which may be modulation order dependent. Where the transmission layer power split is underdetermined, the UE 115 may apply a power splitting constraint to determine the distribution of the EPRE on each non-orthogonal and spatial layer. According to some aspects, the UE 115 may apply a constraint that power is split evenly between spatial layers. In other examples, the UE 115 may apply a constraint that the power of base layer transmissions on each spatial layer are equal. In yet other examples, the UE 115 may apply a constraint that the power of enhancement layer transmissions on each spatial layer are equal. The applied constraint may resolve ambiguity in per-layer power allocation to more accurately determine power for each transmission layer. The UE 115 may then demodulate and decode the respective transmission based on the determined transmit power of the base layer and enhancement layer transmissions.

Features of the disclosure introduced above are further described below in the context of a wireless communications system. Specific examples are then described of example power distributions between transmissions on multiple spatial layers. These and other features of the disclosure are further illustrated by and described with reference to apparatus diagrams, system diagrams, and flowcharts that relate to determining the transmit power of MUST transmissions on multiple spatial layers.

Figure 1:
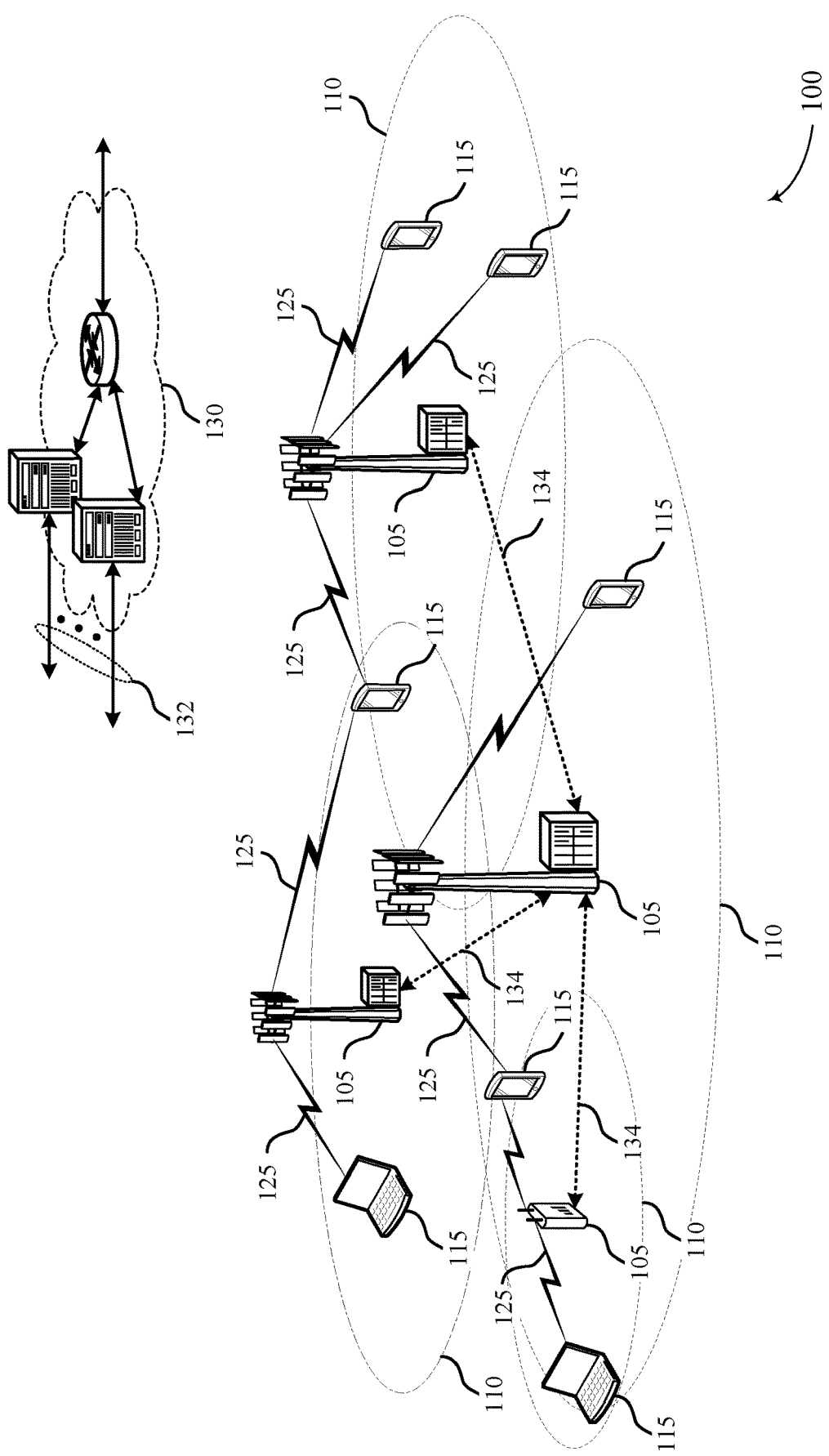
FIG. 1 illustrates an example of a wireless communications system that supports energy determinations for multi-user superposition transmissions (MUSTs) in accordance with aspects of the present disclosure.

FIG. 1 illustrates an example of a wireless communications system 100 that supports energy determinations for MUSTs in accordance with various aspects of the present disclosure. The wireless communications system 100 includes base stations 105, UEs 115, and a core network 130. In some examples, the wireless communications system 100 may be an LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, an MTC device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Multiple Input Multiple Output (MIMO) techniques use multiple antennas at a base station 105 or multiple antennas at a UE 115 to take advantage of multipath environments and spatial resources to transmit multiple data streams. These spatial resources may be called spatial layers, and the same or different streams of data may be transmitted over different spatial layers. The use of multiple spatial layers may increase the reliability or capacity of transmissions through combining signals transmitted via different antenna ports or communicating different data streams via different antenna ports. In some cases, the use of spatial layers in wireless communications system 100 may be adaptive based on the channel quality of spatial layers. For example, a UE 115 may transmit a rank indicator (RI) indicating the number of spatial layers that support a signal-to-noise ratio (SNR) or signal-to-interference plus noise ratio (SINR) that is high enough for communication with the UE 115. A base station 105 may use the RI to determine the number of spatial layers to use for transmissions to the UE 115 (e.g., one (1) spatial layer for RANK1 transmissions and two (2) spatial layers for RANK2 transmissions).

A wireless communications system 100 may use a combination of multiple-access techniques to support communication with the UEs 115 in the network. For instance, a base station 105 may use a time-frequency multiplexing technique (e.g., OFDMA), in addition to MIMO and/or multi-user superposition transmission (e.g., MUST) techniques, to send data to connected UEs 115. A non-orthogonal multiplexing scheme (e.g., MUST) may differ from other multiplexing schemes in that multiple transmissions may be sent using shared resources without orthogonal signal modulation being used. In some examples, a non-orthogonal multiplexing scheme (e.g., MUST) may instead use physical channel characteristics (e.g., geometry, SNR, etc.) of the UEs 115 to differentiate transmissions intended for one UE 115 from transmissions intended for another UE 115.

In an example of non-orthogonal multiplexing, a base station 105 may combine a first modulation scheme (e.g., quadrature phase shift keying (QPSK), 16-quadrature amplitude modulation (QAM), or 64-QAM, etc.) and a second modulation scheme (e.g., QPSK) to construct a combined symbol constellation, which may be used to transmit a multi-layered transmission to multiple UEs. A first transmission layer (e.g., an enhancement layer) of the transmission may be associated with the first modulation scheme, and a second transmission layer (e.g., a base layer) of the transmission may be associated with the second modulation scheme. The combined symbol constellation may inherently split power between the first transmission layer and the second transmission layer—e.g., so that greater power is allocated to the base layer than the enhancement layer. In most cases, the combined symbol constellation may be larger than a modulation scheme used for base layer transmissions. Accordingly, it may be most appropriately used where the SINR associated with a channel used for communication with the combined symbol constellation (e.g., an enhancement layer channel) is high.

In some examples, a base station 105 using MUST techniques may transmit on a first transmission layer at a lower power to a first UE 115 and may transmit on a second transmission layer at a higher power to a second UE 115 using at least partially overlapping physical resources. The first transmission layer may be referred to as an enhancement layer, and the second transmission layer may be referred to as a base layer. The first UE 115 (e.g., enhancement layer UE) may apply interference cancellation techniques to at least partially cancel the higher power transmission layer to decode the lower power transmission layer. The second UE 115 (e.g., base layer UE) may decode the higher power transmission layer, with the low power transmission layer perceived as noise. In some cases, MUST techniques may be used to convey multiple data stream transmissions over the same communication resources without using different spatial layers or orthogonal codes.

MUST techniques may be combined with MIMO techniques to convey multiple data stream transmissions over the same time-frequency resources on multiple non-orthogonal and spatial layers. Accordingly, decoding and demodulation techniques at a UE 115 may be based on the number of spatial layers used for communication with a base station 105. To decode and demodulate a signal, it may be appropriate for a UE 115 to estimate the signal power of downlink transmissions. In some cases, the UE 115 may estimate the signal power based on the measured power of one or more reference signals received from a base station 105.

For unicast transmissions on each spatial layer (e.g., where one UE 115 is allocated all of the power of a given spatial layer), a base station 105 may convey an indication of TPR semi-statically (e.g., via radio resource control (RRC) messaging, etc.). The TPR may indicate the relationship between the transmit power of the reference signals and the transmit power of data signals. For the unicast transmissions, a UE 115 may determine the EPRE of data signals based on the TPR and the measured reference signal (e.g., cell-specific reference signal (CRS)) power. The TPR values may be unicast (e.g., UE-specific) and independent of each other, such that each UE may be unaware of the TPR configured for other UEs. Alternatively, a demodulation reference signal (DMRS) may be used in data transmissions to directly provide power estimation (e.g., having a one-to-one relationship to data transmission power). In addition, the base station 105 may also convey a modulation order (e.g., modulation and coding scheme (MCS), etc.) for each transmission layer.

Similarly to unicast operation, a lower geometry UE 115 (e.g., base layer UE) for a MUST transmission may determine signal power of a base layer transmission based on measured reference signal power (e.g., CRS, DMRS, etc.) and/or unicast TPR values. Alternatively, for some modulation orders (e.g., QPSK), data signal power may be derived directly from the data signals. The lower geometry UE 115 may then demodulate the base layer transmission based on the estimated power, with transmissions on other layers (e.g., enhancement layer layers) being perceived as noise. However, demodulation and decoding of enhancement layer transmissions without knowledge of the transmission power used for each of the base layer and enhancement layer on each spatial layer may result in a higher block error rate (BLER). In some examples, a base station 105 may signal additional information associated with the distribution of power for enhancement layer and base layer layers on each spatial layer to a UE 115. However, this additional signaling between a base station 105 and a UE 115 may increase overhead in wireless communications system 100.

Accordingly, a UE 115 may support techniques for determining the distribution of power for enhancement layer transmissions and base layer transmissions on each spatial layer. In some examples, an enhancement layer UE 115 may determine the total EPRE of a transmission including one or more enhancement layers and one or more base layers using the UE-specific TPR configured for the enhancement layer UE 115. Alternatively, the total EPRE for a spatial layer may be given by the DMRS power (e.g., a one-to-one ratio). In addition, the UE 115 may receive an indication of a modulation order dependent power ratio, which may be different for each spatial layer. For example, the modulation order for the base layer may be predetermined (e.g., QPSK, etc.), and the grant for an enhancement layer may include a field indicating the modulation order (e.g., MCS) for the enhancement layer and a field indicating a power ratio between the enhancement layer and base layer that may depend on the modulation order. However, in some instances the portion of the EPRE for each of multiple base layers and enhancement layers may be underdetermined, which may cause an enhancement layer UE to use estimated values, resulting in higher than desired BLER.

The disclosed techniques for determining the distribution of power for enhancement layer transmissions and base layer transmissions on each spatial layer include applying a power splitting constraint to resolve the ambiguity of power splitting between layers. Specifically, a base station may apply a power splitting constraint in determining transmit power and power ratios between non-orthogonal layers, and the UE 115 may apply the same power splitting constraint to determine the distribution of the EPRE on each spatial and non-orthogonal layer. The power splitting constraint may be static (e.g., preconfigured for the base station 105 and UE 115), semi-static (e.g., configured by the base station 105 via RRC signaling), or dynamic (e.g., a field within a grant message may set or override a default value, etc.). In some examples, the UE 115 may apply a constraint that power is split evenly between spatial layers. In other examples, the UE 115 may apply a constraint that the power of base layer transmissions on each spatial layer are equal. In yet other examples, the UE 115 may apply a constraint that the power of enhancement layer transmissions on each spatial layer are equal. Based on the applied constraint, the UE may use the modulation order dependent power ratio to determine the power of base layer transmissions and enhancement layer transmissions across each spatial layer. The UE 115 may then demodulate and decode the transmission based on the determined power of the base layer and enhancement layer transmissions.

Figure 2:
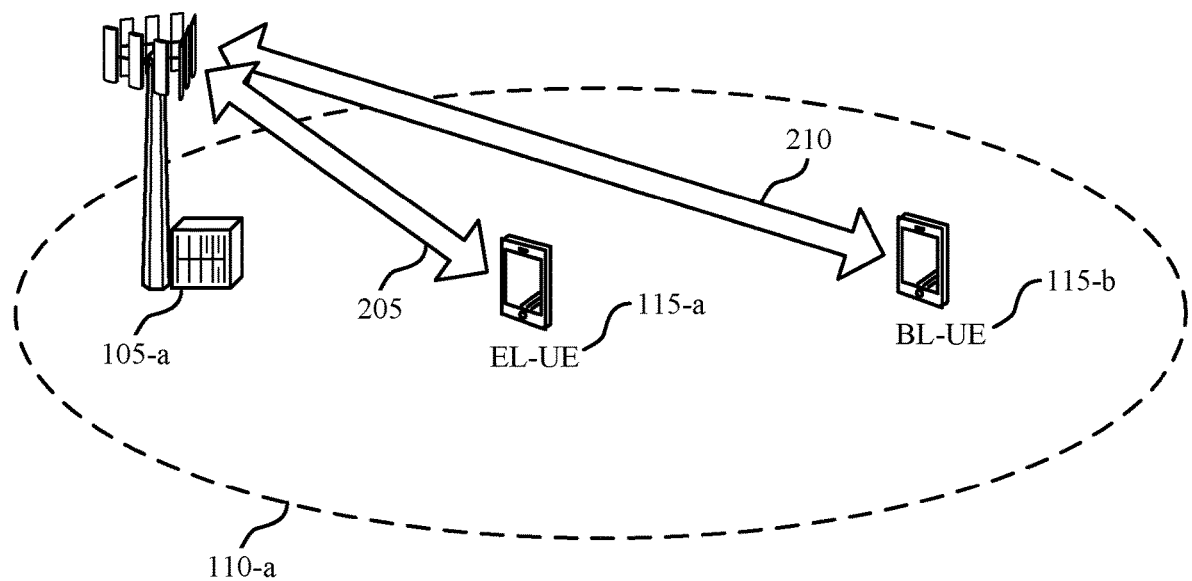
FIG. 2 illustrates an example of a wireless communications system that supports energy determinations for MUSTs in accordance with aspects of the present disclosure.

FIG. 2 illustrates an example of a wireless communications system 200 that supports energy determinations for MUSTs in accordance with various aspects of the present disclosure. Wireless communications system 200 may include enhancement layer UE 115-a, base layer UE 115-b, and base station 105-a which may be examples of a UE 115 or a base station 105 and may communicate with each another as described above with reference to FIG. 1. Enhancement layer UE 115 may be capable of operating in a MUST mode—e.g., may be configured for interference cancellation of base layers and/or MUST-specific processing—and may be dynamically configured to operate in the MUST mode by base station 105-a. Base layer UE 115 may be capable of operating in the MUST mode but, in the illustrated wireless communications system 200, may not be configured with any MUST-specific capabilities.

In the example of FIG. 2, base station 105-a may configure enhancement layer UE 115-a to operate in a MUST mode (e.g., via RRC signaling, etc.) and pair enhancement layer UE 115-a with base layer UE 115-b for one or more MUST transmissions. Base station 105-a may also configure enhancement layer UE 115-a and base layer UE 115-b to receive transmissions via multiple spatial layers. In some cases, base station 105-a may transmit a first transmission layer 205 to enhancement layer UE 115-a and a second transmission layer 210 to base layer UE 115-b on a single spatial layer (e.g., RANK1) or on multiple spatial layers (e.g., RANK2). In the case of a RANK1 transmission, the EPRE may be split between a base layer transmission and an enhancement layer transmission. In the case of a RANK2 transmission, the EPRE may be split between base layer transmissions and enhancement layer transmissions on a first spatial layer and between base layer transmissions and enhancement layer transmissions on a second spatial layer.

To allocate resources for a data transmission, base station 105-a may transmit control messages to each of the enhancement layer UE 115-a and base layer UE 115-b to indicate transmission parameters associated with their respective transmissions. For example, the control messages may indicate the resources used, number of spatial layers, modulation order, etc. In some examples, certain resource elements within a resource block may have a different EPRE (e.g., for symbol periods where CRS are also transmitted, etc.). As such, the control message to the enhancement layer UE 115-a may include an indication of TPR associated with a CRS transmit power and a data transmission transmit power. The enhancement layer UE 115-a may use the TPR and the reference signal transmit power to determine an EPRE of the data transmission. In other cases, an enhancement layer UE 115-a may determine the EPRE of the data transmission based on the measured DMRS power (e.g., data signal power and DMRS may have one-to-one ratio). The control message may also include an indication of the power ratio between an enhancement layer power and a base layer power on a specific spatial layer (e.g., an enhancement layer modulation order dependent power ratio) as described above with reference to FIG. 1. However, as discussed above, the power split across spatial and non-orthogonal layers may be underdetermined and the enhancement layer UE 115-a may not be able to determine the power ratio of the enhancement layer and base layer without knowledge of the distribution of EPRE between spatial layers.

Accordingly, the enhancement layer UE 115-a may apply a power splitting constraint to determine the distribution of power between spatial layers (i.e., power ratio between spatial layers). In some examples, enhancement layer UE 115-a may apply a constraint that indicates that the power is split evenly between spatial layers. In other examples, enhancement layer UE 115-a may apply the constraint that the power is split among enhancement layer transmissions and base layer transmissions, with the transmit power of base layer transmissions on multiple spatial layers being equal. In yet other examples, enhancement layer UE 115-a may apply a constraint that the power is split among enhancement layer transmissions and base layer transmissions, with the transmit power of enhancement layer transmissions on multiple spatial layers being equal. Based on the constraint, an enhancement layer UE 115-a may determine the power of a transmission on a specific spatial layer, and the enhancement layer UE 115-a may apply the enhancement layer modulation order dependent power ratio to calculate the power associated with the enhancement layer and base layer transmissions. In some cases, this calculation may be performed for each resource block of the data transmission since some resource blocks may not include both a base layer and an enhancement layer. The enhancement layer UE 115-a may then demodulate and decode the enhancement layer transmission based on the determined transmit power of the enhancement layer and base layer transmissions.

In a first example, the power splitting constraint may be based on a static configuration for the base station 105-a and the enhancement layer UE 115-a. For example, base station 105-a and enhancement layer UE 115-a may be preconfigured to apply a specific power splitting constraint for transmissions on multiple layers. In a second example, the power splitting constraint may be based on a semi-static configuration at the enhancement layer UE 115-a. For example, enhancement layer UE 115-a may be configured by base station 105-a (e.g., via RRC signaling) to apply a specific power splitting constraint for transmissions on multiple layers. In a third example, the power splitting constraint may be based on a dynamic configuration for enhancement layer UE 115-a (e.g., included in DCI for each MUST grant). The enhancement layer UE 115-a may apply a default constraint that is statically or semi-statically configured, with an option for the base station 105-a to override the configured value using DCI, in some cases. In a fourth example, enhancement layer UE 115-a may select one of a set of configured power splitting constraints for transmissions on multiple layers based on channel conditions associated with multiple spatial layers. For example, the enhancement layer UE 115-a may apply a first power splitting constraint where channel conditions for multiple spatial layers are relatively equal, while applying a different constraint if channel conditions are unequal (e.g., differ by more than a threshold, etc.). Additionally or alternatively, enhancement layer UE 115-a may blindly select one of a set of configured power splitting constraints (e.g., from a restricted set of possible power splitting constraints) for transmissions on multiple layers.

Figure 3A:
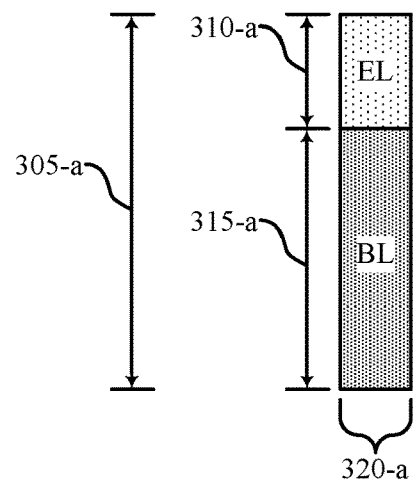
FIGS. 3A-3C illustrate examples of transmissions on different MUST transmission layers in accordance with aspects of the present disclosure.

FIG. 3A illustrates an example of a transmission on different MUST transmission layers, as discussed with reference to FIG. 2, in accordance with various aspects of the present disclosure. In this example, an EPRE 305-a of a transmission from a base station 105 may be divided for multiple transmission layers. A UE 115 may receive a transmission on a first spatial layer 320-a with an enhancement layer and a base layer. The enhancement layer may have power 310-a and the base layer may have power 315-a.

The UE 115 for which the enhancement layer is allocated may determine EPRE 305-a from a UE-specific TPR and a measured power of CRS in the transmission. The enhancement layer grant may also include an indication of a modulation order used for the enhancement layer transmission and a power ratio between the enhancement layer power 310-a and the base layer power 315-a. Because the example of FIG. 3A has one spatial layer, the enhancement layer UE 115 may apply the power ratio between enhancement layer power 310-a and base layer power 315-a to the determined EPRE 305-a to determine the power 310-a of the enhancement layer transmission. The enhancement layer UE 115 may then demodulate and decode the enhancement layer transmission based on the determined power 310-a of the enhancement layer transmission. A base layer UE 115 may demodulate and decode the base layer transmission based on techniques discussed with reference to FIG. 1.

Figure 3B:
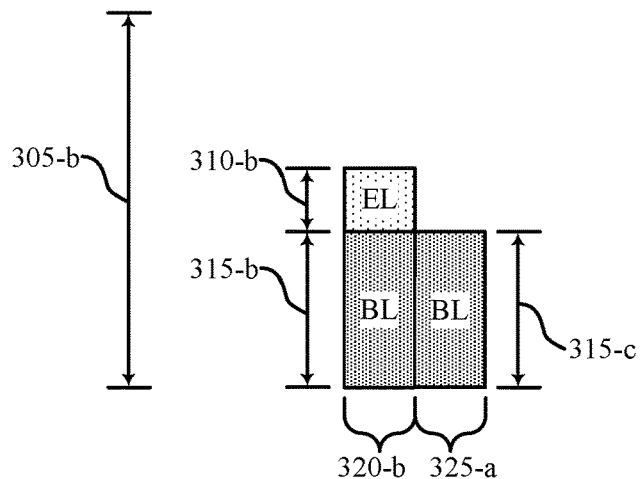

FIG. 3B illustrates an example of transmissions on different MUST transmission layers and different spatial layers, as discussed with reference to FIG. 2, in accordance with various aspects of the present disclosure. In this example, an EPRE 305-b of a transmission from a base station 105 may be divided for multiple transmission layers and multiple spatial layers. As illustrated in the example in FIG. 3B, the transmission includes a first spatial layer 320-b with a first enhancement layer and a first base layer, and a second spatial layer 325-a with a second base layer. Although the EPRE 305-b may be determined by the enhancement layer UE 115 based on measured CRS power and the UE-specific TPR value, and the base station may indicate a power ratio (PR) (e.g., modulation order dependent power ratio) between the first enhancement layer and the first base layer, the power split across non-orthogonal and spatial layers may be underdetermined. That is, the UE 115 may determine that $P_{BL1}+P_{BL2}+P_{EL1}=$EPRE and $P_{EL1}/P_{BL1}=$PR, where EPRE and PR are known, but the system of equations for solving for $P_{BL1}$, $P_{BL2}$, and $P_{EL1}$ is underdetermined.

As shown in this example, an enhancement layer UE 115 may apply the constraint that the EPRE 305-b is split among enhancement layer transmissions and base layer transmissions, with the power 315-b of the first base layer being equal to the power 315-c of the second base layer (e.g., $P_{BL1}=P_{BL2}$). The enhancement layer UE 115 may then solve the system of equations to determine $P_{BL1}$, $P_{BL2}$, and $P_{EL1}$. The enhancement layer UE 115 may then demodulate and decode the enhancement layer transmission based on the determined power levels. A base layer UE 115 may demodulate and decode the base layer transmission based on techniques discussed with reference to FIG. 1.

Figure 3C:
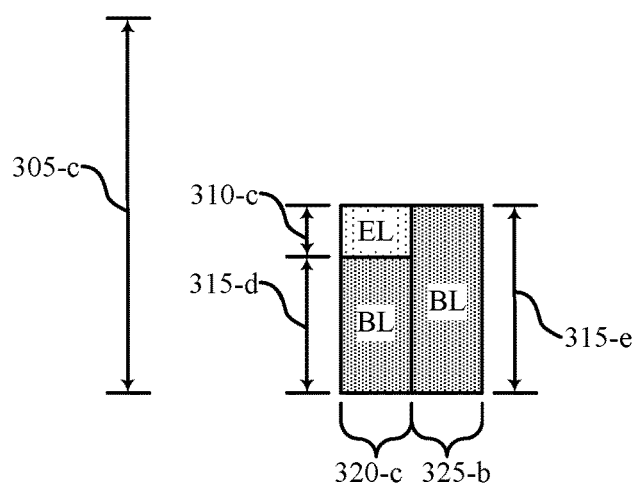

FIG. 3C illustrates an example of transmissions on different MUST transmission layers and different spatial layers, as discussed with reference to FIG. 2, in accordance with various aspects of the present disclosure. As illustrated in the example in FIG. 3C, the transmission includes a first spatial layer 320-c with a first enhancement layer and a first base layer, and a second spatial layer 325-b with a second base layer. As with the example in FIG. 3B, the UE 115 may determine that $P_{BL1}+P_{BL2}+P_{EL1}=$EPRE and $P_{EL1}/P_{BL1}=$PR, where EPRE and PR are known, but the system of equations for solving for $P_{BL1}$, $P_{BL2}$, and $P_{EL1}$ is underdetermined.

In the example of FIG. 3C, the enhancement layer UE 115 may apply the constraint that the EPRE is split among spatial layers according to a predetermined power split ratio (e.g., equal power split). Thus, the enhancement layer UE may determine that power of the first spatial layer 320-c is equal to the power of the second spatial layer 325-b (e.g., $P_{BL1}+P_{EL1}=P_{BL2}$). The enhancement layer UE 115 may then solve the system of equations to determine $P_{BL1}$ 315-d, $P_{BL2}$ 315-e, and $P_{EL1}$ 310-c. The enhancement layer UE 115 may then demodulate and decode the enhancement layer transmission based on the determined enhancement layer power 310-c and base layer power 315-d. The base layer UE(s) 115 may demodulate and decode the base layers of the transmission based on techniques discussed with reference to FIG. 1.

Figure 4A:
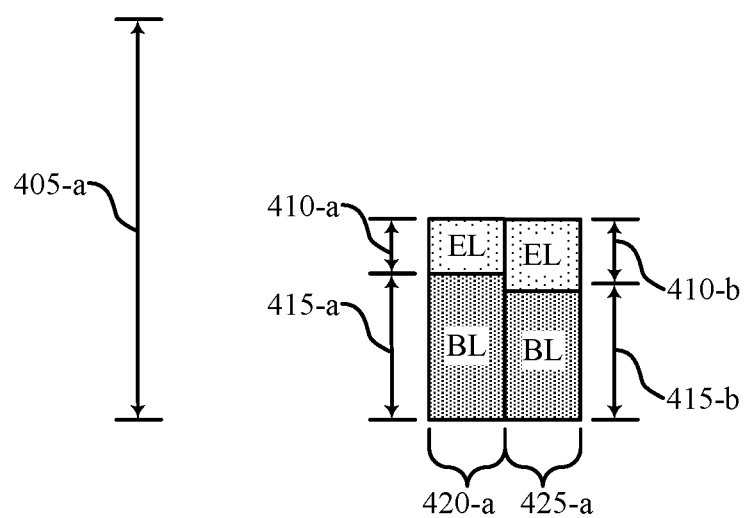
FIGS. 4A and 4B illustrate further examples of transmissions on different MUST transmission layers in accordance with aspects of the present disclosure.

FIG. 4A illustrates an example of transmissions on different MUST transmission layers and different spatial layers, as discussed with reference to FIG. 2, in accordance with various aspects of the present disclosure. In this example, an EPRE 405-a of a transmission from a base station 105 may be divided for multiple transmission layers and multiple spatial layers. As illustrated in the example in FIG. 4A, the transmission includes a first spatial layer 420-a with a first enhancement layer and a first base layer, and a second spatial layer 425-a with a second enhancement layer and second base layer. Although the EPRE 405-a may be determined by the enhancement layer UE 115 based on measured CRS power and the UE-specific TPR value, and the base station may indicate power ratios (e.g., modulation order dependent power ratios) between the first enhancement layer and the first base layer and between the second enhancement layer and the second base layer, the power split across non-orthogonal and spatial layers may be underdetermined. That is, the UE 115 may determine that $P_{BL1}+P_{BL2}+P_{EL1}+P_{EL2}=$EPRE, $P_{EL1}/P_{BL1}=$PR1, and $P_{EL2}/P_{BL2}=$PR2, where EPRE, PR1, and PR2 are known, but the system of equations for solving for $P_{BL1}$, $P_{BL2}$, $P_{EL1}$, and $P_{EL2}$ is underdetermined.

In the example of FIG. 4A, the enhancement layer UE 115 may apply the constraint that the EPRE is equally split among spatial layers. Thus, the enhancement layer UE may determine that power of the first spatial layer 420-*a* is equal to the power of the second spatial layer 425-*a* (e.g., $P_{BL1}+P_{EL1}=P_{BL2}+P_{EL2}$). The enhancement layer UE 115 may then solve the system of equations to determine $P_{BL1}$ 415-*a*, $P_{BL2}$ 415-*b*, $P_{EL1}$ 410-*a* and $P_{EL2}$ 410-*b*. The enhancement layer UE 115 may then demodulate and decode the enhancement layer based on the determined power levels. The base layer UE(s) 115 may demodulate and decode the base layers based on techniques discussed with reference to FIG. 1.

Figure 4B:
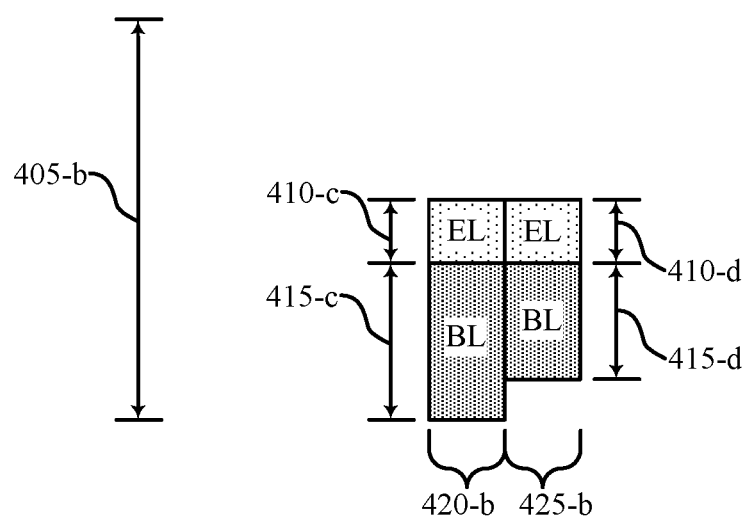

FIG. 4B illustrates an example of transmissions on different MUST transmission layers and different spatial layers, as discussed with reference to FIG. 2, in accordance with various aspects of the present disclosure. In this example, an EPRE 405-*b* of a transmission from a base station 105 may be divided for multiple transmission layers and multiple spatial layers. As illustrated in the example in FIG. 4B, the transmission includes a first spatial layer 420-*b* with a first enhancement layer and a first base layer, and a second spatial layer 425-*b* with a second enhancement layer and second base layer. Although the EPRE 405-*b* may be determined by the enhancement layer UE 115 based on measured CRS power and the UE-specific TPR value, and the base station may indicate power ratios (e.g., modulation order dependent power ratios) between the first enhancement layer and the first base layer and between the second enhancement layer and the second base layer, the power split across non-orthogonal and spatial layers may be underdetermined. That is, the UE 115 may determine that $P_{BL1}+P_{BL2}+P_{EL1}+P_{EL2}=$ EPRE, $P_{EL1}/P_{BL1}=$PR1, and $P_{EL2}/P_{BL2}=$PR2, where EPRE, PR1, and PR2 are known, but the system of equations for solving for $P_{BL1}$, $P_{BL2}$, $P_{EL1}$, and $P_{EL2}$ is underdetermined.

As shown in this example, the enhancement layer UE 115 may apply the constraint that the power of each enhancement layer on different spatial layers is equal. In the illustrated example with two total spatial layers, the UE 115 may apply the constraint that power 410-*c* of the first enhancement layer on the first spatial layer 420-*b* is equal to the power 410-*d* of the second enhancement layer on the second spatial layer 425-*b* (e.g., $P_{EL1}=P_{EL2}$). The enhancement layer UE 115 may then solve the system of equations to determine $P_{BL1}$ 415-*c*, $P_{BL2}$ 415-*d*, $P_{EL1}$ 410-*c* and $P_{EL2}$ 410-*d*. The enhancement layer UE 115 may then demodulate and decode the enhancement layer based on the determined power levels. The base layer UE(s) 115 may demodulate and decode the base layers based on techniques discussed with reference to FIG. 1.

Figure 5A:
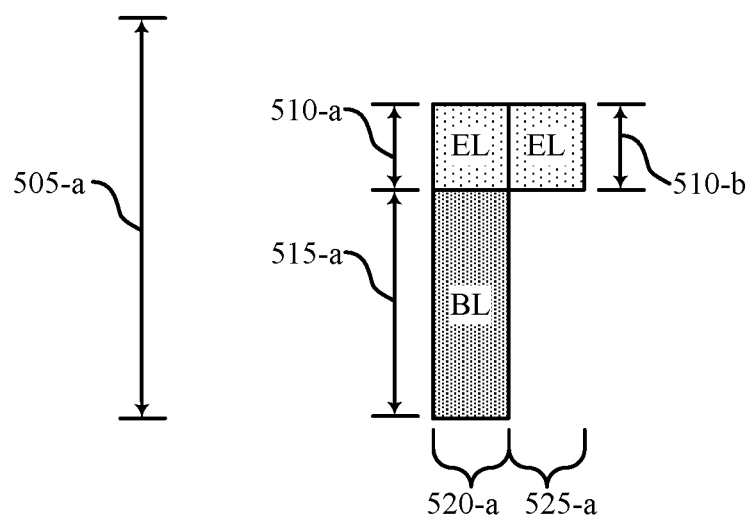
FIGS. 5A and 5B illustrate further examples of transmissions on different MUST transmission layers in accordance with aspects of the present disclosure.

FIG. 5A illustrates an example of transmissions on different MUST transmission layers and different spatial layers, as discussed with reference to FIG. 2, in accordance with various aspects of the present disclosure. In this example, an EPRE 505-*a* of a transmission from a base station 105 may be divided for multiple transmission layers and multiple spatial layers. As illustrated in the example in FIG. 5A, the transmission includes a first spatial layer 520-*a* with a first enhancement layer and a first base layer, and a second spatial layer 525-*a* with a second enhancement layer. Although the EPRE 505-*a* may be determined by the enhancement layer UE 115 based on measured CRS power and the UE-specific TPR value, and the base station may indicate power ratios (e.g., modulation order dependent power ratios) between the first enhancement layer and the first base layer, the power split across non-orthogonal and spatial layers may be underdetermined. That is, the UE 115 may determine that $P_{BL1}+P_{EL1}+P_{EL2}=$EPRE and $P_{EL1}/P_{BL1}=$PR, where EPRE and PR are known, but the system of equations for solving for $P_{BL1}$, $P_{EL1}$, and $P_{EL2}$ is underdetermined.

As shown in this example, an enhancement layer UE 115 may apply the constraint that the power of each enhancement layer across multiple spatial layers is equal. That is, the UE 115 may apply the constraint that power 510-*a* of a first enhancement layer on a first spatial layer 520-*a* is equal to the power 510-*b* of a second enhancement layer transmission on a second spatial layer 525-*a* (e.g., $P_{EL1}=P_{EL2}$). The enhancement layer UE 115 may then solve the system of equations to determine $P_{BL1}$ 515-*a*, $P_{EL1}$ 510-*a* and $P_{EL2}$ 510-*b*. The enhancement layer UE 115 may then demodulate and decode the enhancement layer based on the determined power levels. The base layer UE(s) 115 may demodulate and decode the base layers based on techniques discussed with reference to FIG. 1.

Figure 5B:
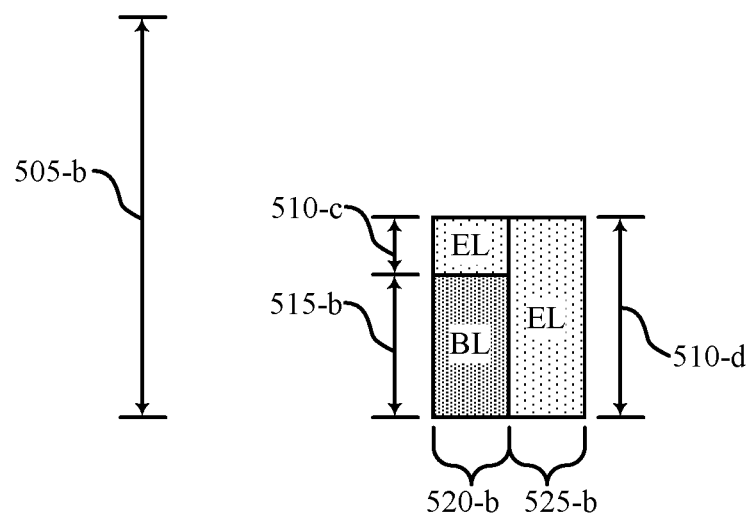

FIG. 5B illustrates an example of transmissions on different MUST transmission layers and different spatial layers, as discussed with reference to FIG. 2, in accordance with various aspects of the present disclosure. In this example, an EPRE 505-*b* of a transmission from a base station 105 may be divided for multiple transmission layers and multiple spatial layers. As illustrated in the example in FIG. 5A, the transmission includes a first spatial layer 520-*b* with a first enhancement layer and a first base layer, and a second spatial layer 525-*b* with a second enhancement layer. Although the EPRE 505-*b* may be determined by the enhancement layer UE 115 based on measured CRS power and the UE-specific TPR value, and the base station may indicate power ratios (e.g., modulation order dependent power ratios) between the first enhancement layer and the first base layer, the power split across non-orthogonal and spatial layers may be underdetermined. That is, the UE 115 may determine that $P_{BL1}+P_{EL1}+P_{EL2}=$EPRE and $P_{EL1}/P_{BL1}=$PR, where EPRE and PR are known, but the system of equations for solving for $P_{BL1}$, $P_{EL1}$, and $P_{EL2}$ is underdetermined.

As shown in this example, an enhancement layer UE 115 may apply the constraint that the EPRE is split among spatial layers according to a predetermined power split ratio (e.g., split equally across spatial layers). In the illustrated example with two spatial layers, UE 115 may determine that the EPRE 505-*b* is split equally between the first spatial layer 520-*b* and the second spatial layer 525-*b* (e.g., $P_{BL1}+P_{EL1}=P_{EL2}$). The enhancement layer UE 115 may then solve the system of equations to determine $P_{BL1}$ 515-*b*, $P_{EL1}$ 510-*c* and $P_{EL2}$ 510-*d*. The enhancement layer UE 115 may then demodulate and decode the enhancement layer based on the determined power levels. The base layer UE(s) 115 may demodulate and decode the base layers based on techniques discussed with reference to FIG. 1.

Figure 6A:
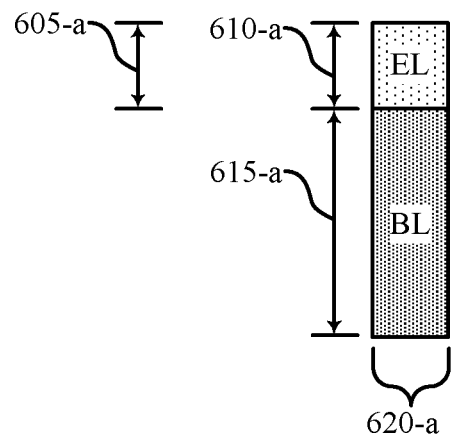
FIGS. 6A and 6B illustrate further examples of transmissions on different MUST transmission layers in accordance with aspects of the present disclosure.

FIG. 6A illustrates an example of a transmission on different MUST transmission layers, as discussed with reference to FIG. 2, in accordance with various aspects of the present disclosure. In this example, a UE-specific TPR may be used to determine a power level 605-*a* for an enhancement layer of a transmission with a single spatial layer 620-*a*. The enhancement layer UE 115 may determine that the measured power (e.g., measured power determined from CRS power) with the UE-specific TPR applied is associated with the enhancement layer transmission and identify the power 610-*a* of the enhancement layer transmission based on this determination. The enhancement layer UE 115 may determine the power 615-*a* of the base layer based on the modulation order dependent power ratio provided by the base station. The enhancement layer UE 115 may then demodulate and decode the enhancement layer based on the determined power 610-*a* of the enhancement layer and determined power 615-*a* of the base layer. A base layer UE 115 may demodulate and decode the base layer transmission based on techniques discussed with reference to FIG. 1.

Figure 6B:
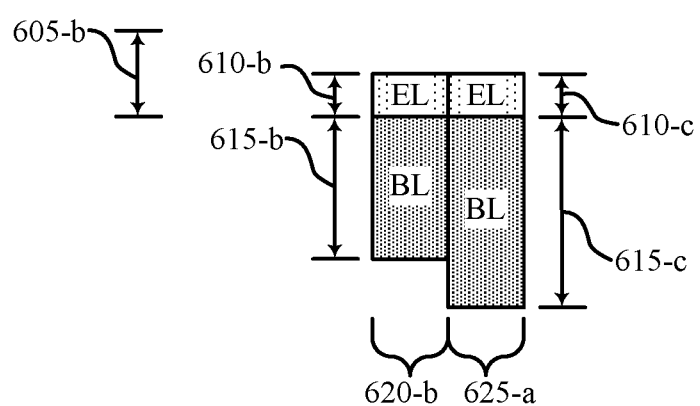

FIG. 6B illustrates an example of transmissions on different MUST transmission layers and different spatial layers, as discussed with reference to FIG. 2, in accordance with various aspects of the present disclosure. In this example, a UE-specific TPR may be used to determine a total power level 605-*b* for enhancement layers of a transmission with a first spatial layer 620-*b* and a second spatial layer 625-*a*.

As shown in this example, an enhancement layer UE 115 may apply the constraint that the total enhancement layer power 605-*b* is split equally between enhancement layer transmissions, with the power 610-*b* of a first enhancement layer on a first spatial layer 620-*b* being equal to the power 610-*c* of a second enhancement layer on a second spatial layer 625-*a*. The enhancement layer UE 115 may then apply modulation order dependent power ratios between the enhancement layers and base layers to determine the power of the base layers. For example, the UE 115 may apply a first modulation order dependent power ratio to the power 610-*b* of the first enhancement layer to determine the power 615-*b* of the first base layer and apply a second modulation order dependent power ratio to the power 610-*c* of the second enhancement layer to determine the power 615-*c* of the second base layer. The enhancement layer UE 115 may then demodulate and decode the enhancement layers based on the determined power levels. The base layer UE(s) 115 may demodulate and decode the base layers based on techniques discussed with reference to FIG. 1.

Figure 7A:
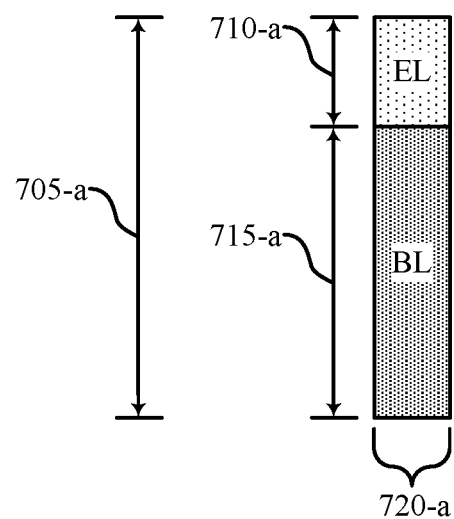
FIGS. 7A and 7B illustrate further examples of transmissions on different MUST transmission layers in accordance with aspects of the present disclosure.

FIG. 7A illustrates an example of a transmission on different MUST transmission layers, as discussed with reference to FIG. 2, in accordance with various aspects of the present disclosure. In this example, an EPRE 705-*a* of a transmission from a base station 105 may be divided for multiple transmission layers. A base station may transmit data to a UE 115 using a UE specific antenna port (e.g., port 7), and include DMRS in the transmission. The UE 115 may determine the EPRE 705-*a* by measuring the signal power of the DMRS. The UE 115 may receive a transmission with an enhancement layer and a base layer on a first spatial layer 720-*a*.

The enhancement layer UE 115 may apply the modulation order dependent power ratio between the enhancement layer and the base layer to determine the power 710-*a* of the enhancement layer and the power 715-*a* of the base layer. The enhancement layer UE 115 may then demodulate and decode the enhancement layer transmission based on the determined power levels. A base layer UE 115 may demodulate and decode the base layer transmission based on techniques discussed with reference to FIG. 1.

Figure 7B:
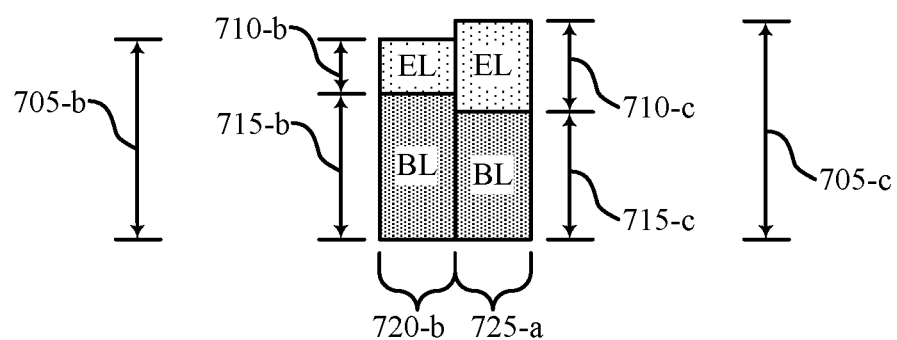

FIG. 7B illustrates an example of a transmission on different MUST transmission layers, as discussed with reference to FIG. 2, in accordance with various aspects of the present disclosure. In this example, the enhancement layer UE 115 may determine EPRE for different layers based on DMRS on different antenna ports. For example, the UE 115 may determine a first EPRE 705-*b* of a first spatial layer 720-*b* based on measuring power of a first DMRS and a second EPRE 705-*c* of a second spatial layer 725-*a* based on measuring power of a second DMRS.

The enhancement layer UE 115 may apply separate modulation order dependent power ratios for each spatial layer to determine the power of the enhancement and base layers for each spatial layer. For example, the UE 115 may apply a first modulation order dependent power ratio to the EPRE 705-*b* to determine the power 710-*b* of the first enhancement layer and the power 715-*b* of the first base layer. The UE 115 may apply a second modulation order dependent power ratio to the EPRE 705-*c* to determine the power 710-*c* of the second enhancement layer and the power 715-*c* of the second base layer. The enhancement layer UE 115 may then demodulate and decode the enhancement layer transmission based on the determined power levels. A base layer UE 115 may demodulate and decode the base layer transmission based on techniques discussed with reference to FIG. 1.

Figure 8A:
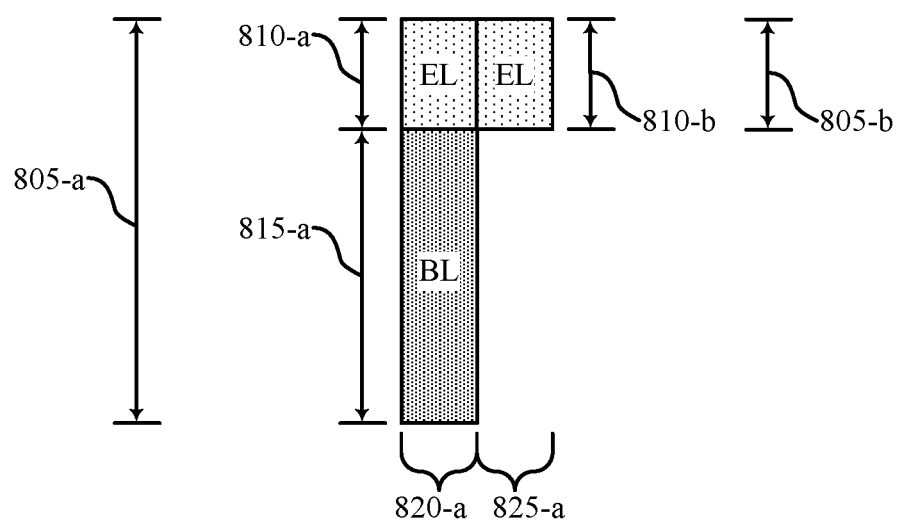
FIGS. 8A and 8B illustrate further examples of transmissions on different MUST transmission layers in accordance with aspects of the present disclosure.

FIG. 8A illustrates an example of a transmission on different MUST transmission layers, as discussed with reference to FIG. 2, in accordance with various aspects of the present disclosure. In this example, an EPRE 805-*a* of a transmission from a base station 105 may be divided for multiple transmission layers. A base station 105 may transmit data to a UE 115 using multiple spatial layers, and the base station 105 may include DMRS for each spatial layer. The UE 115 may determine the EPRE 805-*a* for a first spatial layer 820-*a* by measuring the signal power of the DMRS associated with the first spatial layer 820-*a*. Additionally, the UE 115—may determine a second EPRE 805-*b* by measuring the signal power of the DMRS associated with the second spatial layer 825-*a*.

The enhancement layer UE 115 may apply separate modulation order dependent power ratios for each spatial layer to determine the power of the enhancement and base layers for each spatial layer. For example, the UE 115 may apply a first modulation order dependent power ratio to the EPRE 805-*a* to determine the power 810-*a* of the first enhancement layer and the power 815-*a* of the first base layer. Because the second spatial layer 825-*a* does not have a base layer, the enhancement layer may determine that the power 810-*b* of the enhancement layer on the second spatial layer 825-*a* is equal to the second EPRE 805-*b*. The enhancement layer UE 115 may then demodulate and decode the enhancement layer transmission based on the determined power levels. A base layer UE 115 may demodulate and decode the base layer transmission based on techniques discussed with reference to FIG. 1.

Figure 8B:
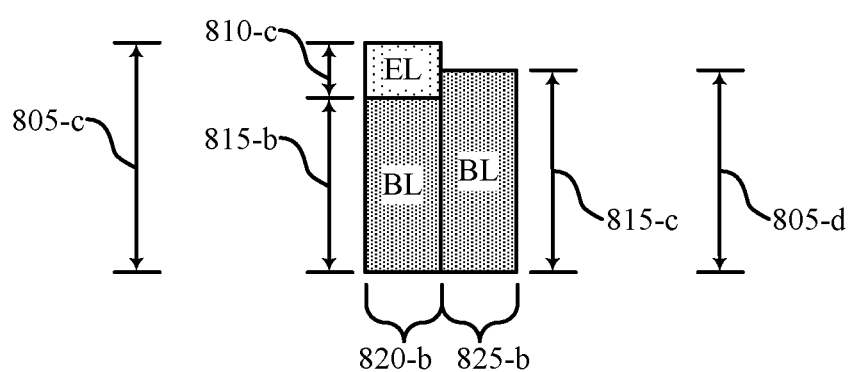

FIG. 8B illustrates an example of a transmission on different MUST transmission layers, as discussed with reference to FIG. 2, in accordance with various aspects of the present disclosure. In this example, an EPRE 805-*c* of a transmission from a base station 105 may be divided for multiple transmission layers. A base station 105 may transmit data to a UE 115 using multiple spatial layers, and the base station 105 may include DMRS for each spatial layer. The UE 115 may determine the EPRE 805-*c* for a first spatial layer 820-*b* by measuring the signal power of the DMRS associated with the first spatial layer 820-*b*. Additionally, the UE 115 may determine a second EPRE 805-*c* by measuring the signal power of the DMRS associated with the second spatial layer 825-*b*.

The enhancement layer UE 115 may apply separate modulation order dependent power ratios for each spatial layer to determine the power of the enhancement and base layers for each spatial layer. For example, the UE 115 may apply a first modulation order dependent power ratio to the EPRE 805-*b* to determine the power 810-*c* of the first enhancement layer and the power 815-*b* of the first base layer. Because the second spatial layer 825-*a* does not have an enhancement layer, the enhancement layer UE 115 may determine that the entire power of the second EPRE 805-*c* is allocated as power 815-*c* to the second base layer. The enhancement layer UE 115 may then demodulate and decode the enhancement layer transmission based on the determined power levels. A base layer UE 115 may demodulate and decode the base layer transmission based on techniques discussed with reference to FIG. 1.

For the techniques discussed with reference to FIGS. 3A-8B, the base station may convey modulation order dependent power ratios to the enhancement layer UE in various ways. Specifically, a base station 105 may indicate the modulation order for the enhancement layer in a modulation and coding scheme (MCS) field of the control message (e.g., grant) for the enhancement layer. In some examples, the MCS field may also be used to convey the power ratio. For example, the options for a coding rate used for communication with the enhancement layer UE 115 may be restricted to convey different power ratios for each of several MCS values. Alternatively, the base station 105 may convey the power ratio in a separate power ratio field for which the power ratios are dependent on the modulation order for the enhancement layer UE indicated in the MCS field (e.g., modulation order dependent power ratio).

Figure 9:
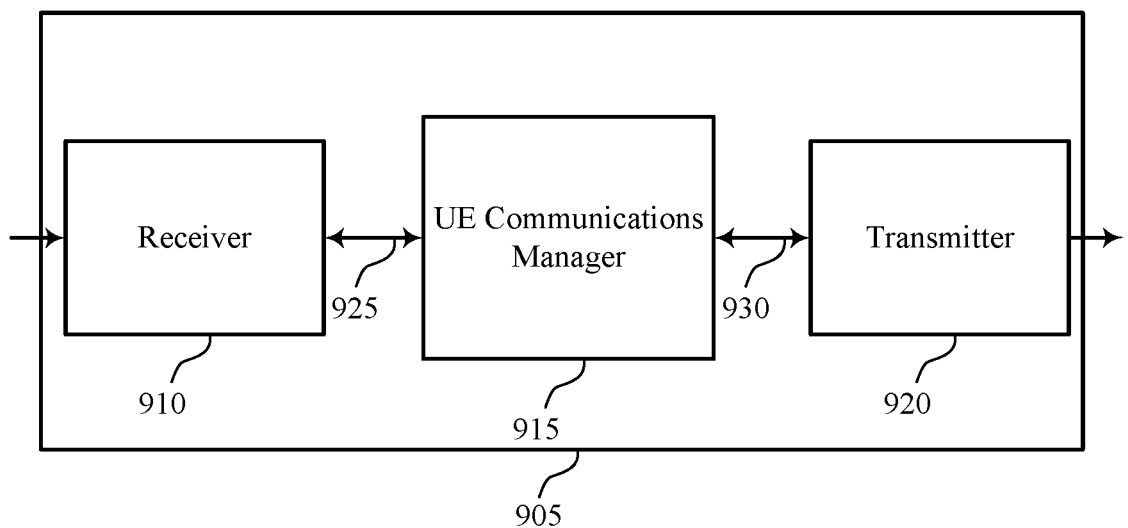
FIGS. 9 through 11 show block diagrams of a device that supports energy determinations for MUSTs in accordance with aspects of the present disclosure.

FIG. 9 shows a block diagram 900 of a wireless device 905 that supports energy determinations for MUSTs in accordance with various aspects of the present disclosure. Wireless device 905 may be an example of aspects of a UE 115 as described with reference to FIG. 1. Wireless device 905 may include receiver 910, UE communications manager 915, and transmitter 920. Wireless device 905 may also include a processor. Each of these components may be in communication with one another.

Receiver 910 may receive information such as packets, user data, or control information associated with various information channels (e.g., control channels, data channels, and information related to energy determinations for MUSTs, etc.). Receiver 910 may also receive a transmission including a base layer and an enhancement layer, where the enhancement layer includes a first data stream modulated according to a first modulation order and the base layer includes a second data stream modulated according to a second modulation order. Information may be passed on to other components of the device, for example, via link 925. The receiver 910 may be an example of aspects of the transceiver 1235 described with reference to FIG. 12.

UE communications manager 915 may be an example of aspects of the UE communications manager 1215 described with reference to FIG. 12. UE communications manager 915 may determine power levels of the enhancement layer and the base layer for each of one or more spatial layers of the transmission based on a power ratio between the base layer and the enhancement layer and a measured power level for a reference signal of the transmission and de-map symbols of the received transmission based on the determined power levels to obtain the first data stream.

Transmitter 920 may transmit signals generated by other components of the wireless device 905. In some cases, transmitter 920 may be in communication with UE communications manager 915 via link 930. In some examples, transmitter 920 may be collocated with a receiver in a transceiver module. For example, the transmitter 920 may be an example of aspects of the transceiver 1235 described with reference to FIG. 12. The transmitter 920 may include a single antenna, or it may include a set of antennas.

Figure 10:
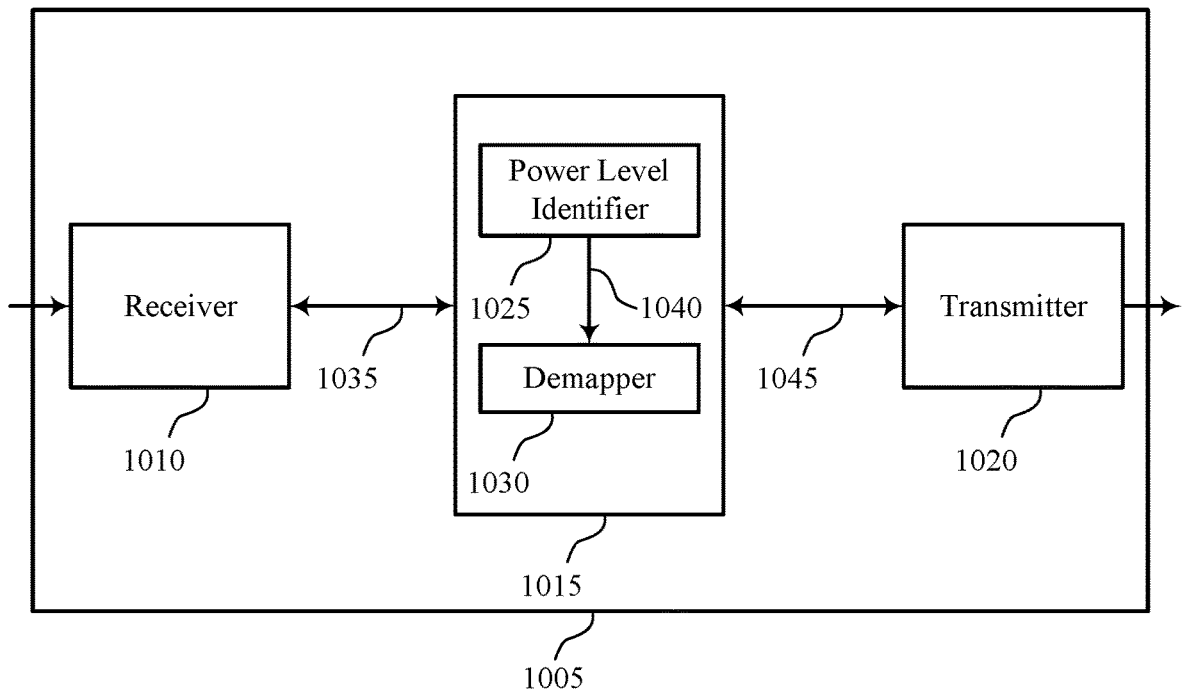

FIG. 10 shows a block diagram 1000 of a wireless device 1005 that supports energy determinations for MUSTs in accordance with various aspects of the present disclosure. Wireless device 1005 may be an example of aspects of a wireless device 905 or a UE 115 as described with reference to FIGS. 1 and 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to energy determinations for MUSTs, etc.). Receiver 1010 may also receive a transmission including a base layer and an enhancement layer, where the enhancement layer includes a first data stream modulated according to a first modulation order and the base layer includes a second data stream modulated according to a second modulation order. Information may be passed on to other components of the device, for example, via link 1035. The receiver 1010 may be an example of aspects of the transceiver 1235 described with reference to FIG. 12.

UE communications manager 1015 may be an example of aspects of the UE communications manager 1215 described with reference to FIG. 12. UE communications manager 1015 may include power level identifier 1025 and demapper 1030.

Power level identifier 1025 may determine power levels of the enhancement layer and the base layer for each of one or more spatial layers of the transmission based on a power ratio between the base layer and the enhancement layer and a measured power level for a reference signal of the transmission. In some cases, the one or more spatial layers includes a set of spatial layers, and power level identifier 1025 may determine the power levels of the enhancement layer and the base layer for each of the set of spatial layers of the transmission based on a predetermined power split between the set of spatial layers. In some cases, the predetermined power split includes an equal power split among all of the set of spatial layers.

In some cases, the one or more spatial layers includes a set of spatial layers, and the power level identifier 1025 may determine the power levels of the enhancement layer and the base layer for each of the set of spatial layers of the transmission based on a condition of equal power levels for each of a set of base layers mapped to respective ones of the set of spatial layers. In some cases, the one or more spatial layers includes a set of spatial layers, and the power level identifier 1025 may determine the power levels of the enhancement layer and the base layer for each of the set of spatial layers of the transmission based on a condition of equal power levels for each of a set of enhancement layers mapped to respective ones of the set of spatial layers.

Demapper 1030 may receive determined power levels 1040 from power level identifier 1025 and may de-map symbols of the received transmission based on the determined power levels 1040 to obtain a first data stream.

Transmitter 1020 may transmit signals generated by other components of wireless device 1005. In some cases, the transmitter 1020 may be in communication with UE communications manager 1015 via link 1045. In some examples, the transmitter 1020 may be collocated with a receiver in a transceiver module. For example, the transmitter 1020 may be an example of aspects of the transceiver 1235 described with reference to FIG. 12. The transmitter 1020 may include a single antenna, or it may include a set of antennas.

Figure 11:
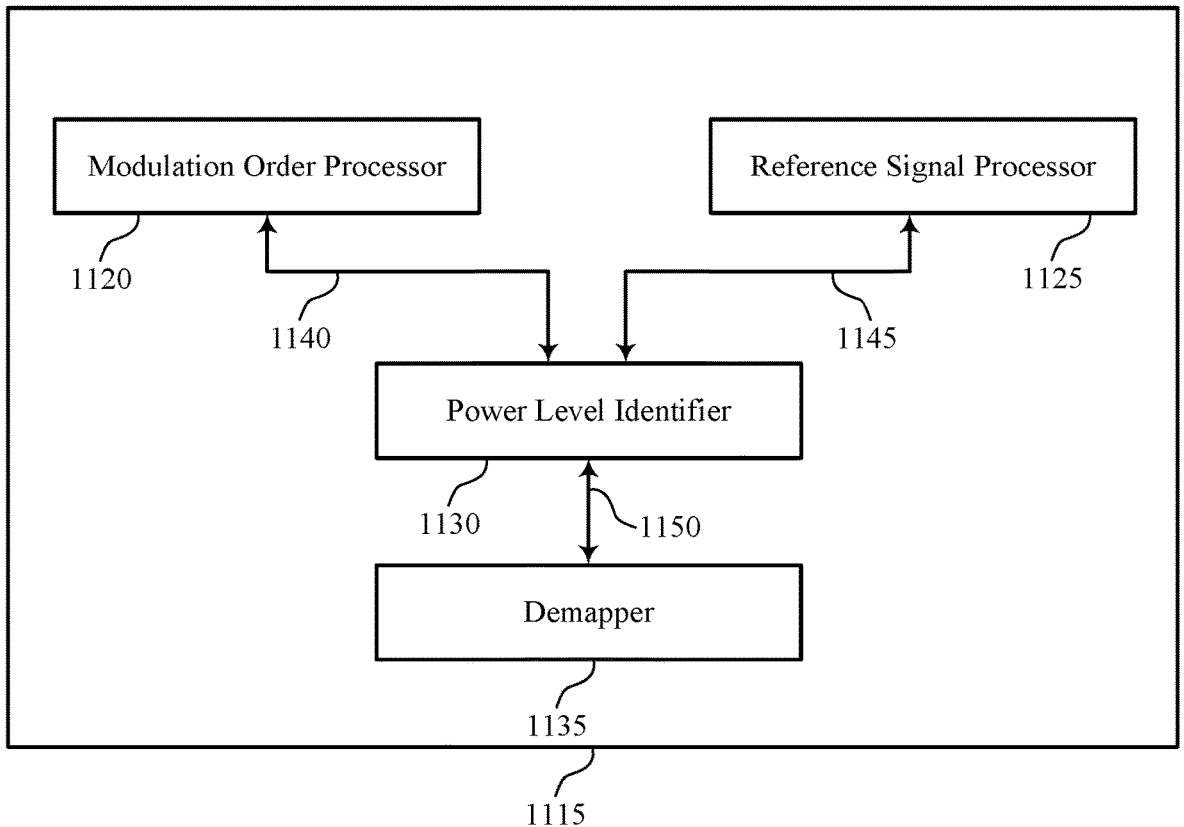

FIG. 11 shows a block diagram 1100 of a UE communications manager 1115 that supports energy determinations for MUSTS in accordance with various aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include modulation order processor 1120, reference signal processor 1125, power level identifier 1130, and demapper 1135.

Power level identifier 1130 may determine power levels of the enhancement layer and the base layer for each of one or more spatial layers of the transmission based on a power ratio between the base layer and the enhancement layer and a measured power level for a reference signal of the transmission. In some cases, the one or more spatial layers includes a set of spatial layers, and the power level identifier 1130 may determine the power levels of the enhancement layer and the base layer for each of the set of spatial layers of the transmission based on a predetermined power split between the set of spatial layers. In some cases, the predetermined power split includes an equal power split among all of the set of spatial layers.

In some cases, the one or more spatial layers includes a set of spatial layers, and the power level identifier 1130 may determine the power levels of the enhancement layer and the base layer for each of the set of spatial layers of the transmission based on a condition of equal power levels for each of a set of base layers mapped to respective ones of the set of spatial layers. In some cases, the one or more spatial layers includes a set of spatial layers, and the power level identifier 1130 may determine the power levels of the enhancement layer and the base layer for each of the set of spatial layers of the transmission based on a condition of equal power levels for each of a set of enhancement layers mapped to respective ones of the set of spatial layers. In some cases, power level identifier 1130 may identify a transmission including a single layer on a single spatial layer (e.g., a transmission received passed on from a receiver), and power level identifier 1130 may determine a total power level of the single layer transmission by applying the first UE-specific power ratio configured for the UE to a measured power level for a CRS of the transmission.

Modulation order processor 1120 may determine the modulation order of a transmission (e.g., base layer transmission or enhancement layer transmission) received either directly or indirectly from a receiver, to allow a UE 115 to identify the power ratio between the transmission on multiple transmission layers (e.g., enhancement layer and base layer). Modulation order processor may then transmit the modulation order information 1140 to power level identifier 1130.

In some cases, the power level identifier 1130 may determine the power levels of the enhancement layer and the base layer for each of the one or more spatial layers based on a base layer modulation order and an enhancement layer modulation order dependent power ratio. In some cases, the second modulation order is a predetermined modulation order. In some cases, the predetermined modulation order corresponds to QPSK. In some cases, the first modulation order corresponds to any of: QPSK, 16-QAM, or 64-QAM.

Reference signal processor 1125 may measure the signal power of reference signals received either directly or indirectly from a receiver, and reference signal processor 1125 may transmit the signal power information 1145 to power level identifier 1130. In some cases, the reference signal includes a CRS, and the power level identifier 1130 may determine a total power level of the enhancement layer and the base layer for each of the one or more spatial layers by applying a first UE-specific power ratio configured for the UE to the measured power level of the CRS identified based on the signal power information 1145. In some cases, the reference signal includes a CRS, and the power level identifier 1130 may determine the power level of the enhancement layer on a respective spatial layer of the transmission by applying a UE-specific power ratio configured for the UE to the measured power level of the CRS for the respective spatial layer.

In some cases, the determining the power levels is performed independently of a second UE-specific power ratio configured for a second UE associated with the base layer. In some cases, the reference signal includes a DMRS, and the power level identifier 1130 may determine that a total power level of the enhancement layer and the base layer on a respective spatial layer of the transmission corresponds to the measured power level of the DMRS for the respective spatial layer.

Demapper 1135 may receive determined power levels 1150 from power level identifier 1130 and may de-map symbols of the received transmission based on the determined power levels 1150 to obtain a first data stream.

Figure 12:
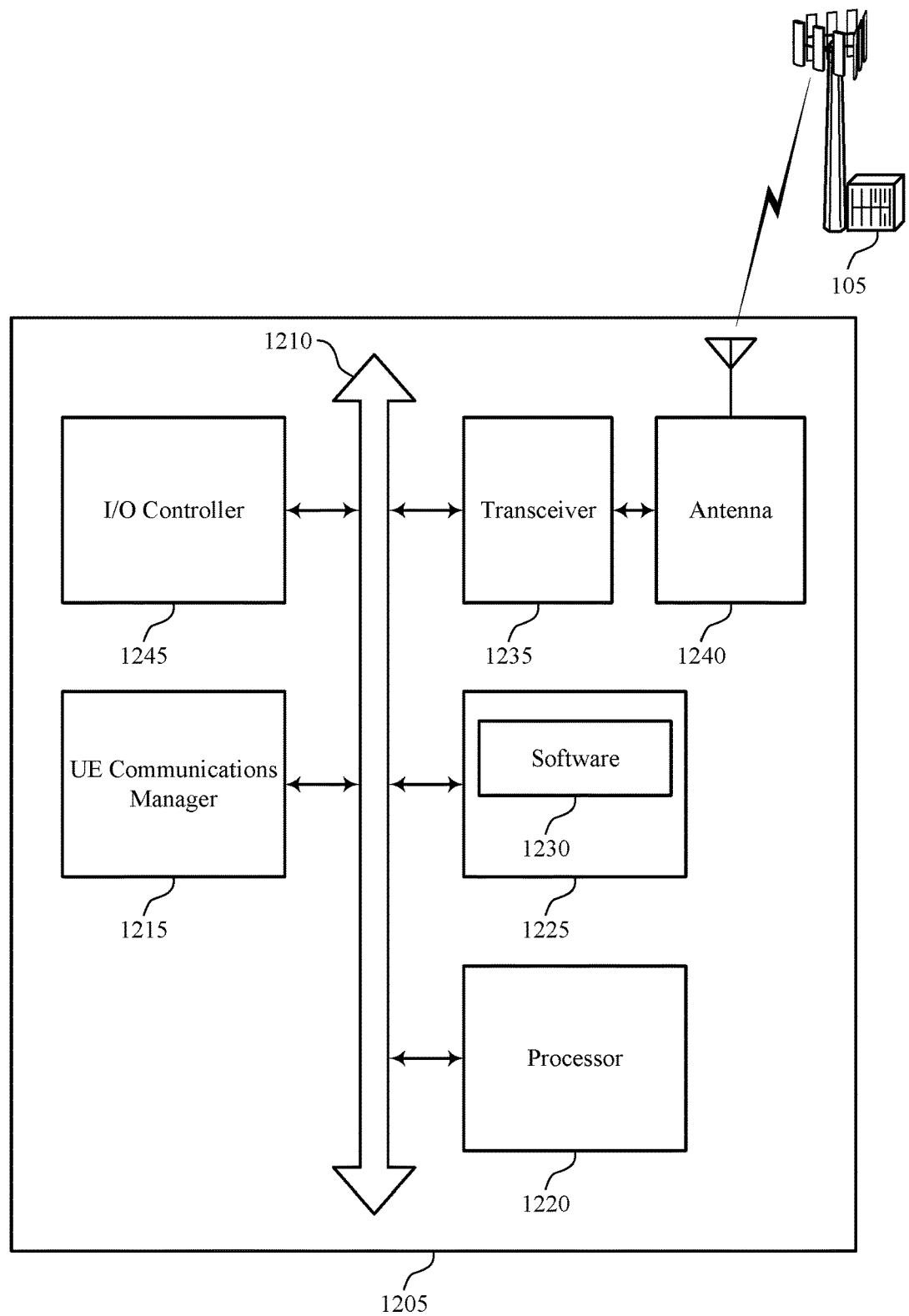
FIG. 12 illustrates a block diagram of a system including a UE that supports energy determinations for MUSTs in accordance with aspects of the present disclosure.

FIG. 12 shows a diagram of a system 1200 including a device 1205 that supports energy determinations for MUSTS in accordance with various aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications over bus 1210. Device 1205 may include components for transmitting and receiving communications, including UE communications manager 1215, processor 1220, memory 1225, software 1230, transceiver 1235, antenna 1240, and I/O controller 1245. These components may be in electronic communication via bus 1210. Device 1205 may communicate wirelessly with one or more base stations 105.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting energy determinations for MUSTs) 1220.

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support energy determinations for MUSTs. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
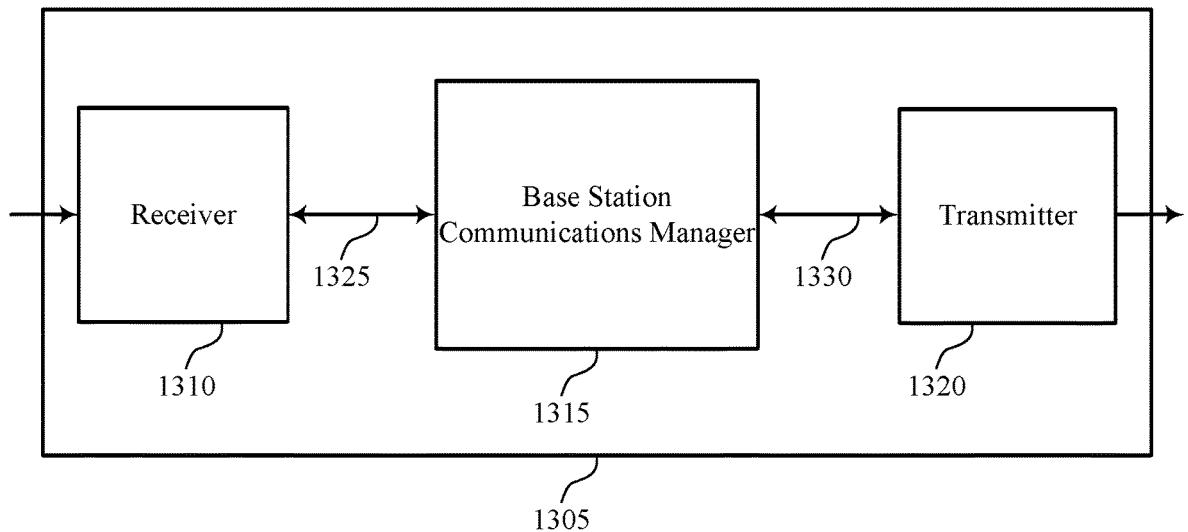
FIGS. 13 through 15 show block diagrams of a device that supports energy determinations for MUSTs in accordance with aspects of the present disclosure.

FIG. 13 shows a block diagram 1300 of a wireless device 1305 that supports energy determinations for MUSTs in accordance with various aspects of the present disclosure. Wireless device 1305 may be an example of aspects of a base station 105 as described with reference to FIG. 1. Wireless device 1305 may include receiver 1310, base station communications manager 1315, and transmitter 1320. Wireless device 1305 may also include a processor. Each of these components may be in communication with one another.

Receiver 1310 may receive information such as packets, user data, or control information associated with various information channels (e.g., control channels, data channels, and information related to energy determinations for MUSTs, etc.). Information may be passed on to other components of the device, for example, via link 1325. The receiver 1310 may be an example of aspects of the transceiver 1635 described with reference to FIG. 16.

Base station communications manager 1315 may be an example of aspects of the base station communications manager 1615 described with reference to FIG. 16. Base station communications manager 1315 may configure a first UE-specific power ratio for a first UE and a second UE-specific power ratio for a second UE, schedule a transmission including a base layer and an enhancement layer, where the enhancement layer includes a first data stream for the first UE modulated according to a first modulation order and the base layer includes a second data stream for the second UE modulated according to a second modulation order, determine transmit power levels of the enhancement layer and the base layer for each of one or more spatial layers of the transmission, and convey a power ratio between the base layer and the enhancement layer for the transmission to the first UE.

Transmitter 1320 may transmit signals generated by other components of the device. Transmitter 1320 may also transmit a base layer and enhancement layer transmission to a first UE and a second UE. In some cases, the transmitter 1320 may be in communication with base station communications manager 1315 via link 1330. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
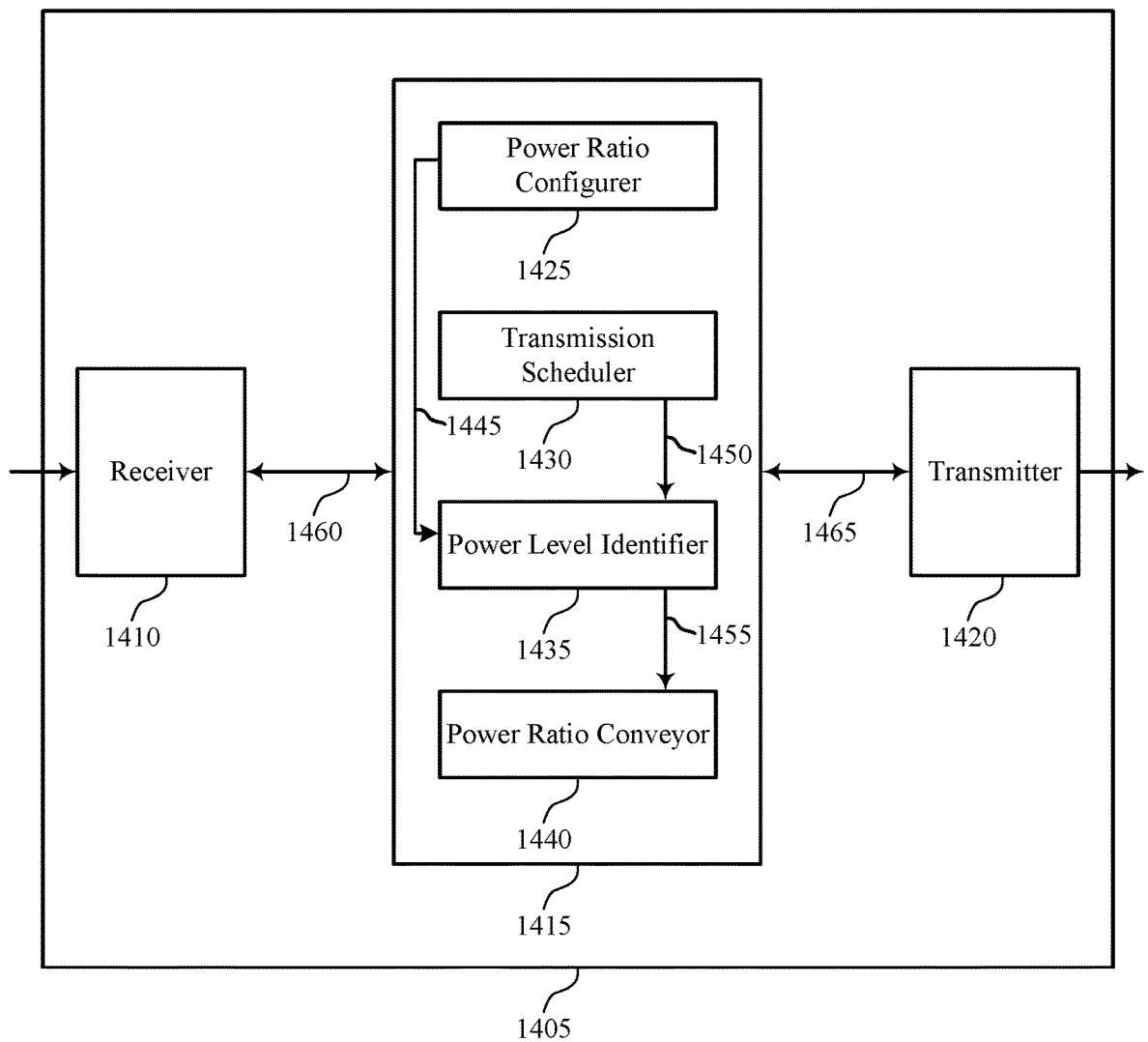

FIG. 14 shows a block diagram 1400 of a wireless device 1405 that supports energy determinations for MUSTs in accordance with various aspects of the present disclosure. Wireless device 1405 may be an example of aspects of a wireless device 1305 or a base station 105 as described with reference to FIGS. 1 and 13. Wireless device 1405 may include receiver 1410, base station communications manager 1415, and transmitter 1420. Wireless device 1405 may also include a processor.

Receiver 1410 may receive information such as packets, user data, or control information associated with various information channels (e.g., control channels, data channels, and information related to energy determinations for MUSTs, etc.). Information may be passed on to base station communications manager 1415, for example, via link 1460. The receiver 1410 may be an example of aspects of the transceiver 1635 described with reference to FIG. 16.

Base station communications manager 1415 may be an example of aspects of the base station communications manager 1615 described with reference to FIG. 16. Base station communications manager 1415 may include power ratio configurer 1425, transmission scheduler 1430, power level identifier 1435, and power ratio conveyor 1440.

Power ratio configurer 1425 may configure a first UE-specific power ratio for a first UE and a second UE-specific power ratio for a second UE. Transmission scheduler 1430 may schedule a transmission including a base layer and an enhancement layer, where the enhancement layer includes a first data stream for the first UE modulated according to a first modulation order and the base layer includes a second data stream for the second UE modulated according to a second modulation order.

Power level identifier 1435 may receive an indication 1445 of the first UE specific power ratio from power ratio configurer 1425, and power level identifier 1435 may receive information 1450 about the enhancement layer and the base layer from transmission scheduler 1430. Power level identifier 1435 may then determine transmit power levels of the enhancement layer and the base layer for each of one or more spatial layers of the transmission based on the first UE-specific power ratio identified in the indication 1445 and based on the information 1450 about the enhancement layer and the base layer. In some cases, the one or more spatial layers includes a set of spatial layers, and power level identifier 1435 may determine the transmit power levels of the enhancement layer and the base layer for each of the set of spatial layers of the transmission based on a predetermined power split between the set of spatial layers.

In some cases, the predetermined power split includes an equal power split among all of the set of spatial layers. In some cases, the one or more spatial layers includes a set of spatial layers, and power level identifier 1435 may determine the transmit power levels of the enhancement layer and the base layer for each of the set of spatial layers of the transmission based on a condition of equal power levels for each of a set of base layers mapped to respective ones of the set of spatial layers. In some cases, the one or more spatial layers includes a set of spatial layers, and power level identifier 1435 may determine the transmit power levels of the enhancement layer and the base layer for each of the set of spatial layers of the transmission based on a condition of equal power levels for each of a set of enhancement layers mapped to respective ones of the set of spatial layers.

Power ratio conveyor 1440 may receive transmit power level information 1455 from power level identifier 1435, and power ratio conveyor 1440 may convey a power ratio between the base layer and the enhancement layer for the transmission to the first UE based on the transmit power level information 1455. In some cases, the power ratio is conveyed to the second UE in an enhancement layer modulation order dependent power ratio parameter of a downlink control information message associated with the transmission.

Transmitter 1420 may transmit signals generated by other components of wireless device 1405. In some cases, the transmitter 1420 may be in communication with base station communications manager 1415 via link 1465. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
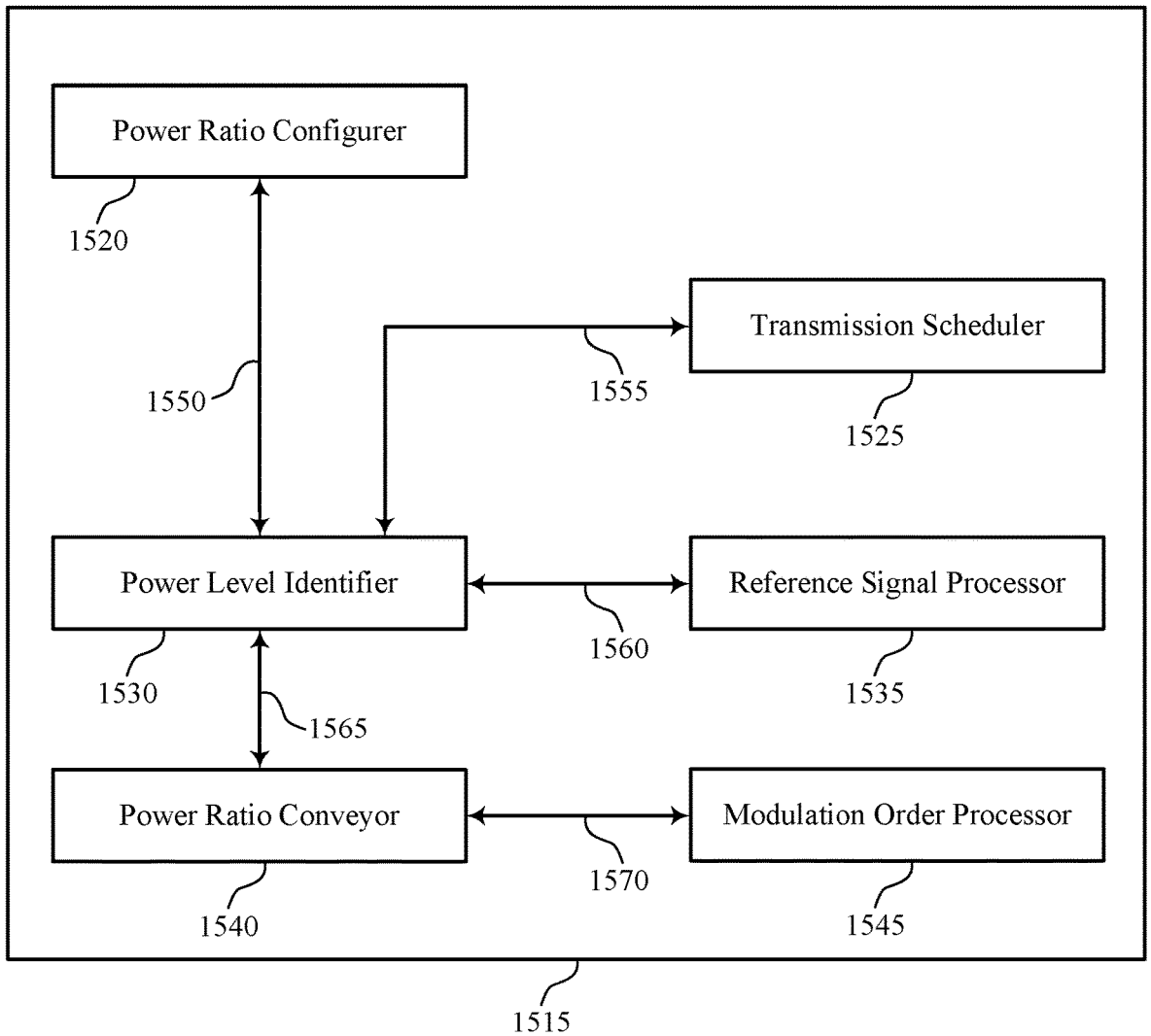

FIG. 15 shows a block diagram 1500 of a base station communications manager 1515 that supports energy determinations for MUSTS in accordance with various aspects of the present disclosure. The base station communications manager 1515 may be an example of aspects of a base station communications manager 1615 described with reference to FIGS. 13, 14, and 16. The base station communications manager 1515 may include power ratio configurer 1520, transmission scheduler 1525, power level identifier 1530, reference signal processor 1535, power ratio conveyor 1540, and modulation order processor 1545.

Power ratio configurer 1520 may configure a first UE-specific power ratio for a first UE and a second UE-specific power ratio for a second UE. Transmission scheduler 1525 may schedule a transmission including a base layer and an enhancement layer, where the enhancement layer includes a first data stream for the first UE modulated according to a first modulation order and the base layer includes a second data stream for the second UE modulated according to a second modulation order.

Power level identifier 1530 may receive an indication 1550 of the first UE specific power ratio from power ratio configurer 1520, and power level identifier 1530 may receive information 1555 about the enhancement layer and the base layer from transmission scheduler 1525. Power level identifier 1435 may then determine transmit power levels of the enhancement layer and the base layer for each of one or more spatial layers of the transmission based on the first UE-specific power ratio identified in the indication 1550 and based on the information 1555 about the enhancement layer and the base layer. In some cases, the one or more spatial layers includes a set of spatial layers, and power level identifier 1530 may determine the transmit power levels of the enhancement layer and the base layer for each of the set of spatial layers of the transmission based on a predetermined power split between the set of spatial layers.

In some cases, the predetermined power split includes an equal power split among all of the set of spatial layers. In some cases, the one or more spatial layers includes a set of spatial layers, and power level identifier 1530 may determine the transmit power levels of the enhancement layer and the base layer for each of the set of spatial layers of the transmission based on a condition of equal power levels for each of a set of base layers mapped to respective ones of the set of spatial layers. In some cases, the one or more spatial layers includes a set of spatial layers, and power level identifier 1530 may determine the transmit power levels of the enhancement layer and the base layer for each of the set of spatial layers of the transmission based on a condition of equal power levels for each of a set of enhancement layers mapped to respective ones of the set of spatial layers.

Reference signal processor 1535 may identify reference signals to include in a transmission. Reference signal processor 1535 may transmit an indication 1560 of the reference signals included in a transmission. In some cases, the transmission includes a CRS, and power level identifier 1530 may determine a total transmit power level of the enhancement layer and the base layer for each of the one or more spatial layers of the transmission by applying the first UE-specific power ratio to a transmit power level of the CRS for each of the one or more spatial layers. In some cases, the determining the transmit power levels of the enhancement layer and the base layer for the transmission is performed independently of the second UE-specific power ratio.

In some cases, the transmission includes a DMRS, and power level identifier 1530 may determine that a total transmit power level of the enhancement layer and the base layer on a respective spatial layer of the transmission corresponds to the transmit power level of the respective DMRS for the respective spatial layer. In some cases, the transmission includes a CRS, and power level identifier 1530 may determine the transmit power level of the enhancement layer on a respective spatial layer of the transmission by applying the second UE-specific power ratio configured for the second UE to the transmit power level of the respective CRS for the respective spatial layer.

Modulation order processor 1545 may select the power ratio based on a set of enhancement layer modulation order dependent power ratios. In some cases, the second modulation order is a predetermined modulation order. In some cases, the predetermined modulation order for the base layer corresponds to QPSK. In some cases, the first modulation order corresponds to any of: QPSK, 16-QAM, or 64-QAM.

Power ratio conveyor 1540 may receive an indication 1565 of the power levels of the enhancement layer and the base layer from power level identifier 1530, and power ratio conveyor 1540 may receive an indication of the selected power ratio 1570 from modulation order processor 1545. Power ratio conveyor 1540 may then use this information to identify and convey a power ratio between the base layer and the enhancement layer for the transmission to the first UE. In some cases, the power ratio is conveyed to the second UE in an enhancement layer modulation order dependent power ratio parameter of a downlink control information message associated with the transmission.

Figure 16:
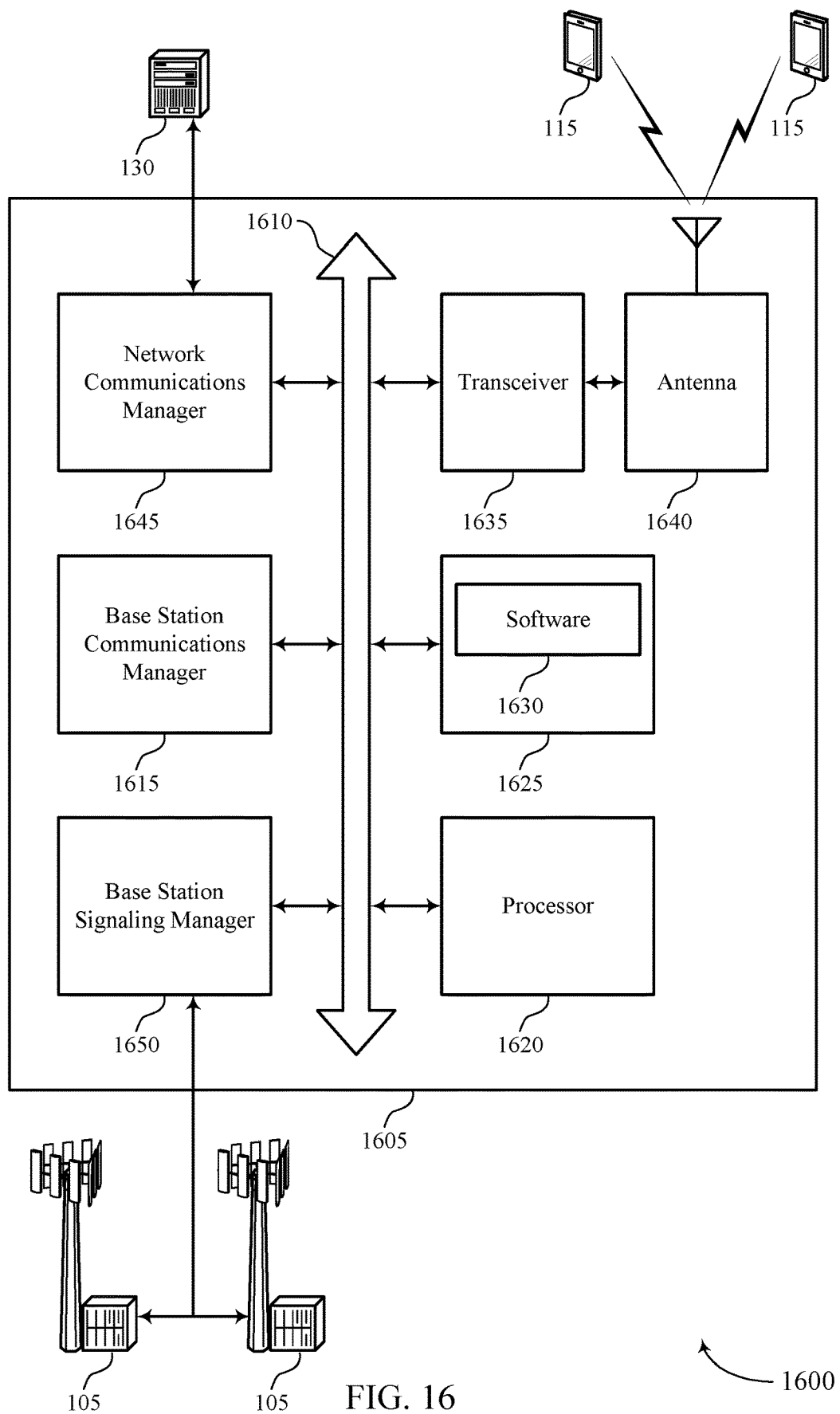
FIG. 16 illustrates a block diagram of a system including a base station that supports energy determinations for MUSTs in accordance with aspects of the present disclosure.

FIG. 16 shows a diagram of a system 1600 including a device 1605 that supports energy determinations for MUSTs in accordance with various aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and base station signaling manager 1650. These components may be in electronic communication via one or more busses 1610. Device 1605 may communicate wirelessly with one or more UEs 115.

Base station communications manager 1615 may manage communications with other base station 105, and may include a controller or scheduler for controlling communications with UEs 115 in cooperation with other base stations 105. For example, the base station communications manager 1615 may coordinate scheduling for transmissions to UEs 115 for various interference mitigation techniques such as beamforming or joint transmission. In some examples, base station communications manager 1615 may provide an X2 interface within an Long Term Evolution (LTE)/LTE-A wireless communication network technology to provide communication between base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting energy determinations for MUSTs) 1620.

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support energy determinations for MUSTs. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Base station signaling manager 1650 may manage communications with other base station 105, and may include a controller or scheduler for controlling communications with UEs 115 in cooperation with other base stations 105. For example, the base station signaling manager 1650 may coordinate scheduling for transmissions to UEs 115 for various interference mitigation techniques such as beamforming or joint transmission. In some examples, base station signaling manager 1650 may provide an X2 interface within an LTE/LTE-A wireless communication network technology to provide communication between base stations 105.

Figure 17:
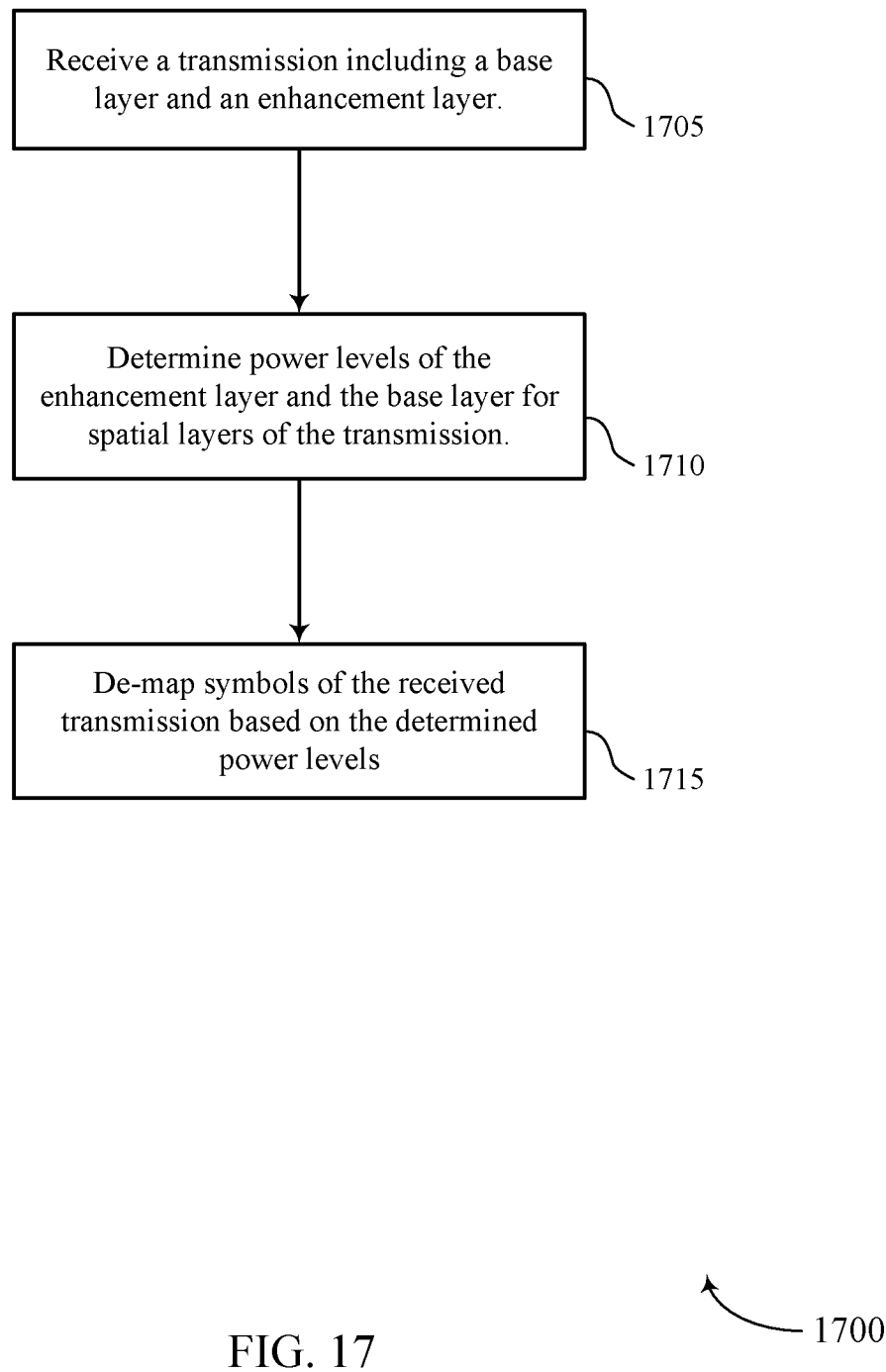
FIGS. 17 and 18 illustrate methods for energy determinations for MUSTs in accordance with aspects of the present disclosure.

FIG. 17 shows a flowchart illustrating a method 1700 for energy determinations for MUSTs in accordance with various aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705, the UE 115 may receive a transmission including a base layer and an enhancement layer, where the enhancement layer includes a first data stream modulated according to a first modulation order and the base layer includes a second data stream modulated according to a second modulation order. For example, a base station may transmit a first transmission layer to the UE 115 (enhancement layer UE) and a second transmission layer to a different UE (base layer UE) on a single spatial layer (e.g., RANK1) or on multiple spatial layers (e.g., RANK2). The UE 115 may receive the first and second transmission layers via one or more antennas. The operations of block 1705 may be performed according to the methods described with reference to FIGS. 1 through 8. In certain examples, aspects of the operations of block 1705 may be performed by a receiver as described with reference to FIGS. 9 through 12.

At block 1710, the UE 115 may determine power levels of the enhancement layer and the base layer for each of one or more spatial layers of the transmission based at least in part on a power ratio between the base layer and the enhancement layer and a measured power level for a reference signal of the transmission. In some cases, the one or more spatial layers includes a set of spatial layers, and the UE 115 may determine the transmit power levels of the enhancement layer and the base layer for each of the set of spatial layers of the transmission based on a predetermined or configured (e.g., via control signaling) power splitting constraint. The power splitting constraint may be, for example, an even power split between spatial layers, the transmit power of base layer transmissions on multiple spatial layers being equal, or the transmit power of enhancement layer transmissions on multiple spatial layers being equal. In some cases, the power level determination may be performed for each resource block of the transmission since some resource blocks may not include both a base layer and an enhancement layer. The operations of block 1710 may be performed according to the methods described with reference to FIGS. 1 through 8. In certain examples, aspects of the operations of block 1710 may be performed by a power level identifier as described with reference to FIGS. 9 through 12.

At block 1715, the UE 115 may de-map symbols of the received transmission based at least in part on the determined power levels to obtain the first data stream. The operations of block 1715 may be performed according to the methods described with reference to FIGS. 1 through 8. In certain examples, aspects of the operations of block 1715 may be performed by a demapper as described with reference to FIGS. 9 through 12.

Figure 18:
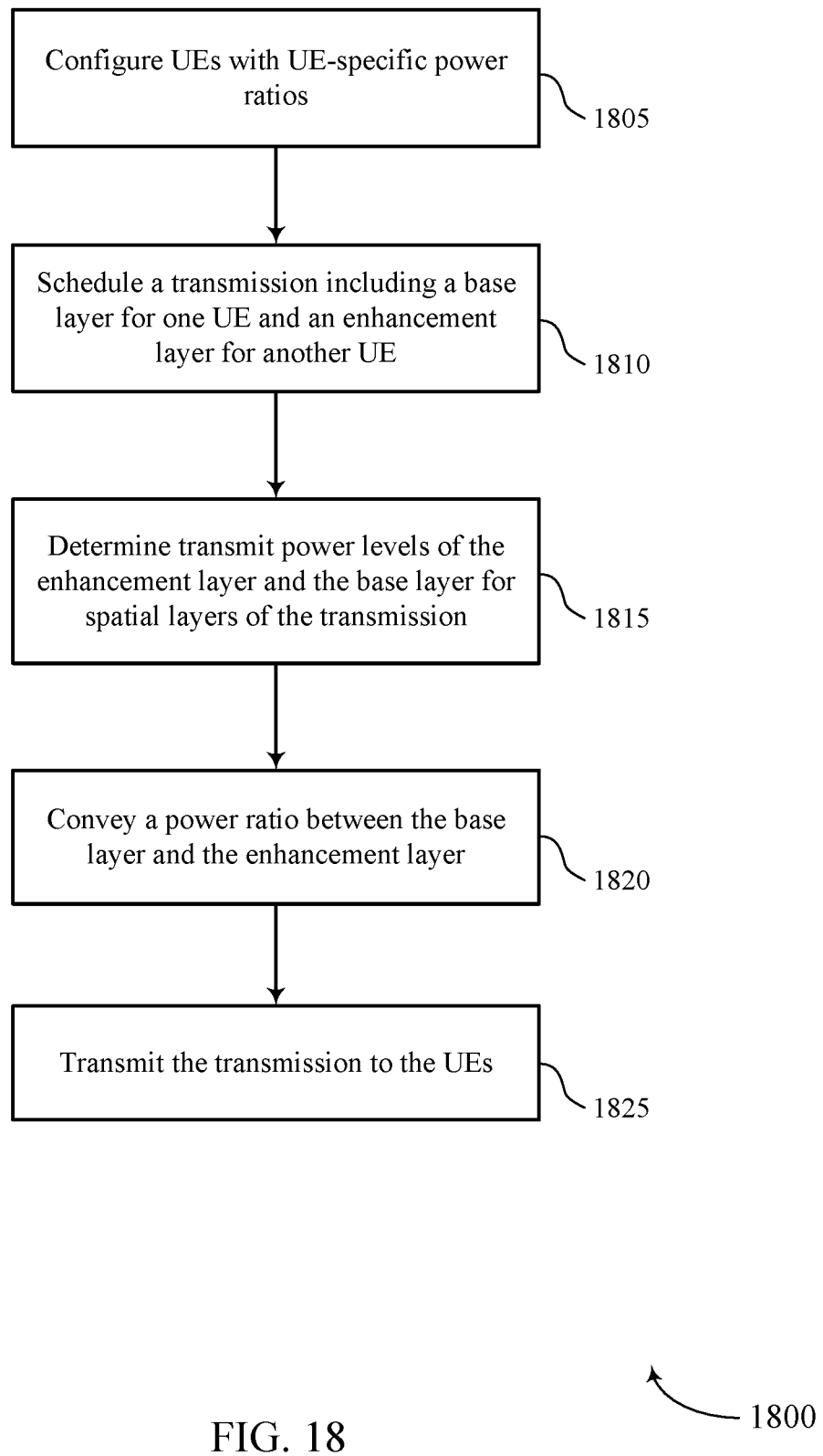

FIG. 18 shows a flowchart illustrating a method 1800 for energy determinations for MUSTS in accordance with various aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station 105 may execute a set of codes to control the functional elements of the device to perform the functions described below.

Additionally or alternatively, the base station 105 may perform aspects of the functions described below using special-purpose hardware.

At block 1805, the base station 105 may configure a first UE-specific power ratio for a first UE and a second UE-specific power ratio for a second UE. The base station 105 may configure the UE-specific power ratios via control (e.g., RRC) signaling. The operations of block 1805 may be performed according to the methods described with reference to FIGS. 1 through 8. In certain examples, aspects of the operations of block 1805 may be performed by a power ratio configurer as described with reference to FIGS. 13 through 16.

At block 1810, the base station 105 may schedule a transmission including a base layer and an enhancement layer, where the enhancement layer includes a first data stream for the first UE modulated according to a first modulation order and the base layer includes a second data stream for the second UE modulated according to a second modulation order. For example, the base station 105 may transmit the enhancement layer to the first UE (enhancement layer UE) and the second transmission layer to the second UE (base layer UE) on a single spatial layer (e.g., RANK1) or on multiple spatial layers (e.g., RANK2). The operations of block 1810 may be performed according to the methods described with reference to FIGS. 1 through 8. In certain examples, aspects of the operations of block 1810 may be performed by a transmission scheduler as described with reference to FIGS. 13 through 16.

At block 1815, the base station 105 may determine transmit power levels of the enhancement layer and the base layer for each of one or more spatial layers of the transmission. In some cases, the one or more spatial layers includes a set of spatial layers, and the base station 105 may determine the transmit power levels of the enhancement layer and the base layer for each of the set of spatial layers of the transmission based on a predetermined or configured (e.g., via control signaling) power splitting constraint. The power splitting constraint may be, for example, an even power split between spatial layers, the transmit power of base layer transmissions on multiple spatial layers being equal, or the transmit power of enhancement layer transmissions on multiple spatial layers being equal. In some cases, the power level determination may be performed for each resource block of the transmission since some resource blocks may not include both a base layer and an enhancement layer. The operations of block 1815 may be performed according to the methods described with reference to FIGS. 1 through 8. In certain examples, aspects of the operations of block 1815 may be performed by a power level identifier as described with reference to FIGS. 13 through 16.

At block 1820, the base station 105 may convey a power ratio between the base layer and the enhancement layer for the transmission to the first UE. The operations of block 1820 may be performed according to the methods described with reference to FIGS. 1 through 8. In certain examples, aspects of the operations of block 1820 may be performed by a power ratio conveyor as described with reference to FIGS. 13 through 16.

At block 1825, the base station 105 may transmit the transmission to the first UE and the second UE. The operations of block 1825 may be performed according to the methods described with reference to FIGS. 1 through 8. In certain examples, aspects of the operations of block 1825 may be performed by a transmitter as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA, UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors each making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. Thus, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a transmission comprising one or more spatial layers, each of the one or more spatial layers comprising an enhancement layer comprising a respective first data stream modulated according to a respective first modulation order, a base layer comprising a respective second data stream modulated according to a respective second modulation order, or the base layer and the enhancement layer;
   determining power levels of the enhancement layers and the base layers of the one or more spatial layers of the transmission based at least in part on a presence of the enhancement layer for each of the one or more spatial layers, a presence of the base layer for each of the one or more spatial layers, a measured power level for a reference signal of the transmission, and an enhancement layer modulation order dependent power ratio; and
   de-mapping symbols of the transmission based at least in part on the determined power levels to obtain the first data stream of the enhancement layers.

2. The method of claim 1, wherein the reference signal comprises a cell-specific reference signal (CRS), and wherein the determining comprises:
   determining a total power level of each of the one or more spatial layers by applying a user equipment (UE)-specific power ratio configured for a UE to the measured power level of the CRS.

3. The method of claim 1, wherein the one or more spatial layers comprises a plurality of spatial layers, and each of the plurality of spatial layers is associated with a respective enhancement layer modulation order dependent power ratio.

4. The method of claim 1, wherein the one or more spatial layers comprises a plurality of spatial layers, and the determining comprises:
   determining the power levels of the enhancement layers and the base layers of the plurality of spatial layers based at least in part on a power split between the plurality of spatial layers.

5. The method of claim 4, wherein the power split comprises an equal power split among the plurality of spatial layers.

6. The method of claim 1, wherein the reference signal comprises a cell-specific reference signal (CRS), and wherein the determining comprises:
   determining the power level of the enhancement layer on a respective spatial layer of the transmission by applying a user equipment (UE)-specific power ratio configured for a UE to the measured power level of the CRS for the respective spatial layer.

7. The method of claim 1, wherein the second modulation order is a predetermined modulation order.

8. The method of claim 7, wherein the predetermined modulation order corresponds to quadrature phase shift keying (QPSK).

9. The method of claim 1, wherein, for each of the one or more spatial layers, the respective first modulation order corresponds to:
   quadrature phase shift keying (QPSK), 16 quadrature amplitude modulation (QAM), or 64-QAM.

10. The method of claim 1, wherein the reference signal comprises a demodulation reference signal, and wherein determining the power levels of the enhancement layers and base layers of the one or more spatial layers of the transmission comprises:
    determining that a total power level of the enhancement layer and the base layer of a respective spatial layer of the transmission corresponds to the measured power level of the demodulation reference signal for the respective spatial layer.

11. A method for wireless communication, comprising:
    configuring a first user equipment (UE)-specific power ratio for a first UE and a second UE-specific power ratio for a second UE;
    scheduling a transmission comprising one or more spatial layers, each of the one or more spatial layers comprising an enhancement layer comprising a respective first data stream for the first UE modulated according to a respective first modulation order, a base layer comprising a respective second data stream for the second UE modulated according to a respective second modulation order, or the base layer and the enhancement layer;
    determining transmit power levels of the enhancement layers and the base layers of the one or more spatial layers of the transmission based at least in part on the first UE-specific power ratio, a presence of the enhancement layer for each of the plurality of spatial layers, a presence of the base layer for each of the plurality of spatial layers, and an enhancement layer modulation order dependent power ratio; and
    transmitting the transmission to the first UE and the second UE.

12. The method of claim 11, wherein the transmission comprises a cell-specific reference signal (CRS), and wherein the determining comprises:
    determining a total transmit power level of each of the one or more spatial layers based at least in part on the first UE-specific power ratio by applying the first UE-specific power ratio to a transmit power level of the CRS for each of the one or more spatial layers.

13. The method of claim 11, wherein the one or more spatial layers comprises a plurality of spatial layers, and the determining comprises:
    determining the transmit power levels of the enhancement layers and the base layers of the plurality of spatial layers based at least in part on a power split between the plurality of spatial layers.

14. The method of claim 13, wherein the power split comprises an equal power split among the plurality of spatial layers.

15. The method of claim 11, wherein, for each of the one or more spatial layers, the respective second modulation order is a predetermined modulation order.

16. The method of claim 11, wherein, for each of the one or more spatial layers, the respective first modulation order corresponds to:
quadrature phase shift keying (QPSK), 16 quadrature amplitude modulation (QAM), or 64-QAM.

17. The method of claim 11, wherein the enhancement layer modulation order dependent power ratio is conveyed to the first UE in power ratio parameter of a downlink control information message associated with the transmission.

18. The method of claim 17, wherein the one or more spatial layers comprises a plurality of spatial layers, and the downlink control information message associated with the transmission comprises a respective power ratio parameter for each of the plurality of spatial layers.

19. The method of claim 11, wherein the transmission comprises a demodulation reference signal, and wherein determining the transmit power levels of the enhancement layers and base layers of the one or more spatial layers of the transmission comprises:
determining that a total power level of the enhancement layer and the base layer of a respective spatial layer of the transmission corresponds to the measured power level of the demodulation reference signal for the respective spatial layer.

20. An apparatus for wireless communication, comprising:
a processor; and
memory coupled to the processor, the processor and memory configured to:
receive a transmission comprising one or more spatial layers, each of the one or more spatial layers comprising an enhancement layer comprising a respective first data stream modulated according to a respective first modulation order, a base layer comprising a respective second data stream modulated according to a respective second modulation order, or the base layer and the enhancement layer;
determine power levels of the enhancement layers and the base layers of the one or more spatial layers of the transmission based at least in part on a presence of the enhancement layer for each of the one or more spatial layers, a presence of the base layer for each of the one or more spatial layers, a measured power level for a reference signal of the transmission, and an enhancement layer modulation order dependent power ratio; and
de-map symbols of the transmission based at least in part on the determined power levels to obtain the first data stream of the enhancement layers.

21. The apparatus of claim 20, wherein the reference signal comprises a cell-specific reference signal (CRS), and wherein the processor and memory are configured to:
determine a total power level of each of the one or more spatial layers by applying a user equipment (UE)-specific power ratio configured for a UE to the measured power level of the CRS.

22. The apparatus of claim 20, wherein the one or more spatial layers comprises a plurality of spatial layers, and each of the plurality of spatial layers is associated with a respective enhancement layer modulation order dependent power ratio.

23. The apparatus of claim 20, wherein the one or more spatial layers comprises a plurality of spatial layers, and wherein the processor and memory are configured to:
determine the power levels of the enhancement layers and the base layers of the plurality of spatial layers based at least in part on a power split between the plurality of spatial layers.

24. The apparatus of claim 20, wherein the reference signal comprises a cell-specific reference signal (CRS), and wherein the processor and memory are configured to:
determine the power level of the enhancement layer on a respective spatial layer of the transmission by applying a user equipment (UE)-specific power ratio configured for a UE to the measured power level of the CRS for the respective spatial layer.

25. The apparatus of claim 20, wherein the second modulation order is a predetermined modulation order.

26. The apparatus of claim 20, wherein, for each of the one or more spatial layers, the respective first modulation order corresponds to:
quadrature phase shift keying (QPSK), 16 quadrature amplitude modulation (QAM), or 64-QAM.

27. The apparatus of claim 20, wherein the reference signal comprises a demodulation reference signal, and wherein the processor and the memory are configured to:
determine that a total power level of the enhancement layer and the base layer of a respective spatial layer of the transmission corresponds to the measured power level of the demodulation reference signal for the respective spatial layer.

28. An apparatus for wireless communication, comprising:
a processor; and
memory coupled to the processor, the processor and memory configured to:
configure a first user equipment (UE)-specific power ratio for a first UE and a second UE-specific power ratio for a second UE;
schedule a transmission comprising one or more spatial layers, each of the one or more spatial layers comprising an enhancement layer comprising a respective first data stream for the first UE modulated according to a respective first modulation order, a base layer comprising a respective second data stream for the second UE modulated according to a respective second modulation order, or the base layer and the enhancement layer;
determine transmit power levels of the enhancement layers and the base layers of the one or more spatial layers of the transmission based at least in part on the first UE-specific power ratio, a presence of the enhancement layer for each of the plurality of spatial layers, a presence of the base layer for each of the plurality of spatial layers, and an enhancement layer modulation order dependent power ratio; and
transmit the transmission to the first UE and the second UE.

29. The apparatus of claim 28, wherein the transmission comprises a cell-specific reference signal (CRS), and wherein the processor and memory are configured to:
determine a total transmit power level of each of the one or more spatial layers based at least in part on the first UE-specific power ratio by applying the first UE-specific power ratio to a transmit power level of the CRS for each of the one or more spatial layers.

30. The apparatus of claim 28, wherein the one or more spatial layers comprises a plurality of spatial layers, and wherein the processor and memory are configured to:
 determine the transmit power levels of the enhancement layers and the base layers of the plurality of spatial layers based at least in part on a power split between the plurality of spatial layers.

31. The apparatus of claim 28, wherein, for each of the one or more spatial layers, the respective second modulation order is a predetermined modulation order.

32. The apparatus of claim 28, wherein, for each of the one or more spatial layers, the respective first modulation order corresponds to:
 quadrature phase shift keying (QPSK), 16 quadrature amplitude modulation (QAM), or 64-QAM.

33. The apparatus of claim 28, wherein the enhancement layer modulation order dependent power ratio is conveyed to the first UE in power ratio parameter of a downlink control information message associated with the transmission.

34. The apparatus of claim 28, wherein the transmission comprises a demodulation reference signal, and wherein the processor and the memory are configured to:
 determine that a total power level of the enhancement layer and the base layer of a respective spatial layer of the transmission corresponds to the measured power level of the demodulation reference signal for the respective spatial layer.

35. An apparatus for wireless communication, comprising:
 means for receiving a transmission comprising one or more spatial layers, each of the one or more spatial layers comprising an enhancement layer comprising a respective first data stream modulated according to a respective first modulation order, a base layer comprising a respective second data stream modulated according to a respective second modulation order, or the base layer and the enhancement layer;
 means for determining power levels of the enhancement layers and the base layers of the one or more spatial layers of the transmission based at least in part on a presence of the enhancement layer for each of the one or more spatial layers, a presence of the base layer for each of the one or more spatial layers, a measured power level for a reference signal of the transmission, and an enhancement layer modulation order dependent power ratio; and
 means for de-mapping symbols of the transmission based at least in part on the determined power levels to obtain the first data stream of the enhancement layers.

36. The apparatus of claim 35, wherein the reference signal comprises a demodulation reference signal, and wherein the means for determining the power levels of the enhancement layers and base layers of the one or more spatial layers of the transmission comprises:
 means for determining a total power level of each of the one or more spatial layers by applying a user equipment (UE)-specific power ratio configured for a UE to the measured power level of the CRS.

37. A non-transitory computer readable medium storing code for wireless communication, the code comprising instructions executable by a processor to:
 receive a transmission comprising one or more spatial layers, each of the one or more spatial layers comprising an enhancement layer comprising a respective first data stream modulated according to a respective first modulation order, a base layer comprising a respective second data stream modulated according to a respective second modulation order, or the base layer and the enhancement layer;
 determine power levels of the enhancement layers and the base layers of the one or more spatial layers of the transmission based at least in part on a presence of the enhancement layer for each of the one or more spatial layers, a presence of the base layer for each of the one or more spatial layers, a measured power level for a reference signal of the transmission, and an enhancement layer modulation order dependent power ratio; and
 de-map symbols of the transmission based at least in part on the determined power levels to obtain the first data stream of the enhancement layers.

38. The apparatus of claim 31, wherein the reference signal comprises a demodulation reference signal, and wherein the means for determining the power levels of the enhancement layers and base layers of the one or more spatial layers of the transmission comprises:
 means for determining that a total power level of the enhancement layer and the base layer of a respective spatial layer of the transmission corresponds to the measured power level of the demodulation reference signal for the respective spatial layer.

39. The non-transitory computer readable medium of claim 37, wherein the reference signal comprises a demodulation reference signal, and wherein the code comprising instructions executable by the processor to determine the power levels of the enhancement layers and base layers of the one or more spatial layers of the transmission comprises code comprising instructions executable by the processor to:
 determine a total power level of each of the one or more spatial layers by applying a user equipment (UE)-specific power ratio configured for a UE to the measured power level of the CRS.

40. The non-transitory computer readable medium of claim 37, wherein the reference signal comprises a demodulation reference signal, and wherein the code comprising instructions executable by the processor to determine the power levels of the enhancement layers and base layers of the one or more spatial layers of the transmission comprises code comprising instructions executable by the processor to:
 determine that a total power level of the enhancement layer and the base layer on a respective spatial layer of the transmission corresponds to the measured power level of the demodulation reference signal for the respective spatial layer.

41. An apparatus for wireless communication, comprising:
 means for configuring a first user equipment (UE)-specific power ratio for a first UE and a second UE-specific power ratio for a second UE;
 means for scheduling a transmission comprising one or more spatial layers, each of the one or more spatial layers comprising an enhancement layer comprising a respective first data stream for the first UE modulated according to a respective first modulation order, a base layer comprising a respective second data stream for the second UE modulated according to a respective second modulation order, or the base layer and the enhancement layer;
 means for determining transmit power levels of the enhancement layers and the base layers of the one or more spatial layers of the transmission based at least in part on the first UE-specific power ratio, a presence of the enhancement layer for each of the plurality of spatial layers, a presence of the base layer for each of the plurality of spatial layers, and an enhancement layer modulation order dependent power ratio; and means for transmitting the transmission to the first UE and the second UE.

42. The apparatus of claim 41, wherein the transmission comprises a cell-specific reference signal (CRS), and wherein the means for determining the transmit power levels of the enhancement layers and base layers of the one or more spatial layers of the transmission comprises:

means for determining a total transmit power level of each of the one or more spatial layers based at least in part on the first UE-specific power ratio by applying the first UE-specific power ratio to a transmit power level of the CRS for each of the one or more spatial layers.

43. The apparatus of claim 41, wherein the transmission comprises a demodulation reference signal, and wherein the means for determining the transmit power levels of the enhancement layers and base layers of the one or more spatial layers of the transmission comprises:

means for determining that a total power level of the enhancement layer and the base layer of a respective spatial layer of the transmission corresponds to the measured power level of the demodulation reference signal for the respective spatial layer.

44. A non-transitory computer readable medium storing code for wireless communication, the code comprising instructions executable by a processor to:

configure a first user equipment (UE)-specific power ratio for a first UE and a second UE-specific power ratio for a second UE;

schedule a transmission comprising one or more spatial layers, each of the one or more spatial layers comprising an enhancement layer comprising a respective first data stream for the first UE modulated according to a respective first modulation order, a base layer comprising a respective second data stream for the second UE modulated according to a respective second modulation order, or the base layer and the enhancement layer;

determine transmit power levels of the enhancement layers and the base layers of the one or more spatial layers of the transmission based at least in part on the first UE-specific power ratio, a presence of the enhancement layer for each of the plurality of spatial layers, a presence of the base layer for each of the plurality of spatial layers, and an enhancement layer modulation order dependent power ratio; and transmit the transmission to the first UE and the second UE.

45. The non-transitory computer readable medium of claim 44, wherein the transmission comprises a cell-specific reference signal (CRS), and wherein the code comprising instructions executable by the processor to determine the transmit power levels of the enhancement layers and base layers of the one or more spatial layers of the transmission comprises code comprising instructions executable by the processor to:

determine a total transmit power level of each of the one or more spatial layers based at least in part on the first UE-specific power ratio by applying the first UE-specific power ratio to a transmit power level of the CRS for each of the one or more spatial layers.

46. The non-transitory computer readable medium of claim 44, wherein the transmission comprises a demodulation reference signal, and wherein the code comprising instructions executable by the processor to determine the transmit power levels of the enhancement layers and base layers of the one or more spatial layers of the transmission comprises code comprising instructions executable by the processor to:

determine that a total power level of the enhancement layer and the base layer of a respective spatial layer of the transmission corresponds to the measured power level of the demodulation reference signal for the respective spatial layer.

* * * * *